United States Patent
Tsai et al.

(10) Patent No.: US 9,600,021 B2
(45) Date of Patent: Mar. 21, 2017

(54) OPERATING CLOCK SYNCHRONIZATION ADJUSTING METHOD FOR INDUCTION TYPE POWER SUPPLY SYSTEM

(71) Applicant: Fu Da Tong Technology Co., Ltd., New Taipei (TW)

(72) Inventors: Ming-Chiu Tsai, New Taipei (TW); Chi-Che Chan, New Taipei (TW)

(73) Assignee: Fu Da Tong Technology Co., Ltd., New Taipei (TW)

( * ) Notice: Subject to any disclaimer, the term of this patent is extended or adjusted under 35 U.S.C. 154(b) by 918 days.

(21) Appl. No.: 13/900,544

(22) Filed: May 23, 2013

(65) Prior Publication Data

US 2013/0254570 A1    Sep. 26, 2013

Related U.S. Application Data

(63) Continuation-in-part of application No. 13/488,724, filed on Jun. 5, 2012, now Pat. No. 9,048,881, which (Continued)

(30) Foreign Application Priority Data

| Feb. 1, 2011 | (TW) | ............................. 100103836 A |
| Mar. 14, 2012 | (TW) | ............................. 101108610 A |
| Feb. 4, 2013 | (TW) | ............................. 102104223 A |

(51) Int. Cl.
*G06F 1/12*   (2006.01)
*G06F 1/32*   (2006.01)
*H04B 5/00*   (2006.01)

(52) U.S. Cl.
CPC ............... *G06F 1/12* (2013.01); *G06F 1/324* (2013.01); *H02J 50/10* (2016.02); *H04B 5/0031* (2013.01); *H04B 5/0037* (2013.01); *H04B 5/0075* (2013.01)

(58) Field of Classification Search
CPC ... G06F 1/12; H02J 17/00; H02J 50/00–50/90
(Continued)

(56) References Cited

U.S. PATENT DOCUMENTS

| 4,393,516 A | * | 7/1983 | Itani | ........................ H04L 7/027 370/509 |
| 4,561,443 A | | 12/1985 | Hogrefe | |

(Continued)

FOREIGN PATENT DOCUMENTS

| CN | 101252293 A | 8/2008 |
| CN | 101834473 A | 9/2010 |

(Continued)

*Primary Examiner* — Fritz M Fleming
(74) *Attorney, Agent, or Firm* — Winston Hsu; Scott Margo

(57) ABSTRACT

An operating clock synchronization adjusting method, for an induction type power supply system, includes receiving a plurality of data pulses, by a supplying-end module, according to a clock of a microprocessor of the supplying-end module, for generating a plurality of data frames. A period between first data pulses corresponding to starting bits of a first detecting data frame and a second detecting frame among the plurality of data frame is calculated, for acquiring a data frame period. A period between the first data pulse of the second data frame and a second data pulse of the second data frame is calculated, for acquiring a bit period. The bit period and a bit time threshold are compared for determining whether to adjust the clock of the microprocessor according to the data frame period and a frame time threshold.

3 Claims, 46 Drawing Sheets

Related U.S. Application Data is a continuation-in-part of application No. 13/154,965, filed on Jun. 7, 2011, now Pat. No. 8,810,072.

(58) Field of Classification Search
USPC .................................................. 713/400, 401
See application file for complete search history.

(56) References Cited

U.S. PATENT DOCUMENTS

| | | | |
|---|---|---|---|
| 5,734,254 A | 3/1998 | Stephens | |
| 5,987,244 A | 11/1999 | Kau | |
| 6,122,329 A | 9/2000 | Zai | |
| 6,154,375 A | 11/2000 | Majid | |
| 6,184,651 B1 | 2/2001 | Fernandez | |
| 6,345,203 B1 | 2/2002 | Mueller | |
| 7,336,929 B2 | 2/2008 | Yasuda | |
| 7,720,452 B2 | 5/2010 | Miyahara | |
| 7,791,311 B2 | 9/2010 | Sagoo | |
| 7,847,438 B2 | 12/2010 | Jin | |
| 8,004,235 B2 | 8/2011 | Baarman | |
| 8,041,974 B2 | 10/2011 | Lin | |
| 8,072,310 B1 | 12/2011 | Everhart | |
| 8,098,043 B2 | 1/2012 | Lin | |
| 8,183,827 B2 | 5/2012 | Lyon | |
| 8,188,619 B2 | 5/2012 | Azancot | |
| 8,217,535 B2 | 7/2012 | Uchida et al. | |
| 8,217,621 B2 * | 7/2012 | Tsai | H02J 7/025 320/108 |
| 8,248,024 B2 | 8/2012 | Yuan et al. | |
| 8,358,103 B2 | 1/2013 | Eastlack | |
| 8,373,387 B2 | 2/2013 | Bourilkov et al. | |
| 8,412,963 B2 * | 4/2013 | Tsai | G06F 1/266 307/104 |
| 8,417,359 B2 * | 4/2013 | Tsai | H02J 17/00 307/104 |
| 8,541,975 B2 | 9/2013 | Park et al. | |
| 8,772,979 B2 * | 7/2014 | Tsai | H02J 5/005 307/104 |
| 8,810,072 B2 * | 8/2014 | Tsai | H02J 7/025 307/104 |
| 9,048,881 B2 * | 6/2015 | Tsai | H04B 5/0031 |
| 9,075,587 B2 * | 7/2015 | Tsai | G06F 1/266 |
| 2006/0017550 A1 | 1/2006 | Yoshida | |
| 2007/0177533 A1 | 8/2007 | Palay | |
| 2008/0079392 A1 | 4/2008 | Baarman | |
| 2008/0231120 A1 | 9/2008 | Jin | |
| 2009/0009006 A1 | 1/2009 | Jin | |
| 2009/0026844 A1 | 1/2009 | Iisaka | |
| 2009/0033294 A1 | 2/2009 | Odajima | |
| 2009/0174263 A1 | 7/2009 | Baarman | |
| 2009/0267561 A1 | 10/2009 | Lin | |
| 2009/0271048 A1 * | 10/2009 | Wakamatsu | G06F 1/266 700/296 |
| 2009/0284082 A1 * | 11/2009 | Mohammadian | G06K 7/0008 307/104 |
| 2009/0302800 A1 * | 12/2009 | Shiozaki | H02J 7/025 320/108 |
| 2009/0322280 A1 | 12/2009 | Kamijo | |
| 2010/0007307 A1 | 1/2010 | Baarman | |
| 2010/0270867 A1 | 10/2010 | Abe | |
| 2010/0277003 A1 | 11/2010 | Von Novak et al. | |
| 2010/0279606 A1 | 11/2010 | Hillan | |
| 2011/0065398 A1 | 3/2011 | Liu | |
| 2011/0136550 A1 | 6/2011 | Maugars | |
| 2011/0158329 A1 | 6/2011 | Oettinger | |
| 2011/0159812 A1 | 6/2011 | Kim | |
| 2011/0176589 A1 | 7/2011 | Kolof | |
| 2011/0196544 A1 | 8/2011 | Baarman | |
| 2011/0204723 A1 | 8/2011 | Irish | |
| 2011/0273138 A1 | 11/2011 | Baarman | |
| 2011/0285212 A1 | 11/2011 | Higuma | |
| 2012/0025622 A1 | 2/2012 | Kim | |
| 2012/0272076 A1 | 10/2012 | Tsai | |
| 2012/0293009 A1 | 11/2012 | Kim | |
| 2012/0328061 A1 | 12/2012 | Chow | |
| 2013/0015705 A1 | 1/2013 | Abe | |
| 2013/0162204 A1 | 6/2013 | Jung | |
| 2013/0175873 A1 * | 7/2013 | Kwon | H04B 5/0037 307/104 |
| 2013/0176023 A1 | 7/2013 | Komiyama | |
| 2013/0234532 A1 | 9/2013 | Fells | |
| 2014/0024919 A1 | 1/2014 | Metzenthen | |
| 2014/0152251 A1 | 6/2014 | Kim | |
| 2015/0008756 A1 | 1/2015 | Lee | |
| 2015/0028875 A1 | 1/2015 | Irie | |

FOREIGN PATENT DOCUMENTS

| | | |
|---|---|---|
| CN | 101978571 A | 2/2011 |
| CN | 101272063 B | 1/2012 |
| CN | 102315692 A | 1/2012 |
| CN | 102710409 A | 10/2012 |
| CN | 102804619 A | 11/2012 |
| CN | 102904475 A | 1/2013 |
| CN | 103248130 A | 8/2013 |
| CN | 103424133 A | 12/2013 |
| CN | 103425169 A | 12/2013 |
| CN | 103595144 A | 2/2014 |
| CN | 103975497 A | 8/2014 |
| CN | 105449875 A | 3/2016 |
| EP | 2608419 A2 | 6/2013 |
| EP | 2 793 355 A1 | 10/2014 |
| JP | 200660909 A | 3/2006 |
| TW | M246884 | 10/2004 |
| TW | 200527302 | 8/2005 |
| TW | 201018042 | 5/2010 |
| TW | 201034334 A1 | 9/2010 |
| TW | 201123673 | 7/2011 |
| TW | 201123676 | 7/2011 |
| TW | 201128972 | 8/2011 |
| TW | 201138258 | 11/2011 |
| TW | 201234871 | 8/2012 |
| TW | 201243281 | 11/2012 |
| TW | 201251389 | 12/2012 |
| TW | I389416 | 3/2013 |
| TW | 201315082 | 4/2013 |
| TW | I408861 | 9/2013 |
| TW | 201412047 | 3/2014 |
| TW | 201414130 | 4/2014 |
| TW | 201415752 | 4/2014 |
| TW | 201417445 | 5/2014 |
| TW | 201440368 A | 10/2014 |
| TW | I459676 B | 11/2014 |
| TW | I472897 | 2/2015 |
| TW | I483509 B | 5/2015 |
| WO | 2009149464 A2 | 12/2009 |

\* cited by examiner

OPERATING CLOCK SYNCHRONIZATION ADJUSTING METHOD FOR INDUCTION TYPE POWER SUPPLY SYSTEM

CROSS REFERENCE TO RELATED APPLICATIONS

This application is a continuation-in-part application of, and claims the benefit of, U.S. patent application Ser. No. 13/488,724, which was filed on Jun. 5, 2012 and is a continuation-in-part application of U.S. patent application Ser. No. 13/154,965.

BACKGROUND OF THE INVENTION

1. Field of the Invention

The present invention relates to an operating clock synchronization adjusting method for an induction type power supply system. In the induction type power supply system with a method of time-synchronized data transmission, a supplying-end and a receiving-end of the induction type power supply system predict time of detecting data impulses via configuring timers of microprocessors and arranging operations of programs in the supplying-end and the receiving-end. In such a condition, the timers of the microprocessors in the supplying-end module and that of the microprocessor in the receiving-end module need to be precisely synchronized. Via the present invention, operating clocks of the microprocessors in the supplying-end and the receiving-end can be synchronized for achieving the function of automatic timer synchronization.

2. Description of the Prior Art

In the digital age, digital products are seen everywhere in our life, for example, portable electronic devices such as digital cameras, mobile phones, music players (MP3 and MP4) and etc. These portable electronic devices and products tend to become light, thin, short and small in design. The first requirement for portability is power supply, and the most common solution is to install rechargeable batteries in portable electronic devices, so that these devices can be recharged when electricity runs out. Yet, now everyone has a number of portable electronic devices with a specific charger compatible with each of them. To use a charger for charging a portable electronic device, it is necessary to link the connection interface (plug) of the charger with a receptacle and plug the connector of the charger at the other end into the portable electronic device. While repeated plugging and pulling of connection interfaces easily causes damage to its terminals in the long period, induction type power supply systems can avoid this problem by transmitting power through coil induction without terminal contact.

Usually, functional settings or compilation and transmission of data, etc. shall be conducted for electronic devices in addition to charging. For some electronic devices, settings and input can be conducted directly, but for other electronic devices (e.g. music players (MP3, MP4, etc). digital cameras, electronic watches, portable game machines and consoles), settings cannot be conducted directly and other electronic devices (such as computers, personal digital assistants, etc.) are required to fulfill functional settings and data transmission. Besides, usually charging and data transmission cannot be conducted synchronously and must be carried out separately. Induction type power supply systems (or so called wireless chargers) currently available in the marketplace rely on two coils to operate: one acting as a supplying-end coil to transmit power and the other acting as a receiving-end coil to receive power. Since wireless power energy can cause dangers and heat tip metal objects on the same principle as an induction stove, it is also easy to cause damage or failure of objects that are being charged due to heating effect.

For existing induction type power supply systems, the most important technical problem is the ability to identify objects placed on the supplying-end coil. Like a cooking induction stove, induction power can transmit enormous energy of electromagnetic waves, which may heat up metal objects and cause dangers if directed towards these objects. To solve this problem, some firms try to develop technologies of identifying objects, and after putting efforts for several years, find that the best solution that depends on a receiving-end coil of a receiving-end module to transmit feedback signals and on a supplying-end coil to receive signals. The most important core technology is to achieve the function of transmitting data through the induction coils. It is difficult to transmit data stably through induction coils for supplying power, because main carrier waves are transmitted by high-power electricity and may be affected by interferences occurring during use of power systems. Moreover, since it also constitutes a frequency-changer control system, the operating frequency of carriers will not be fixed; furthermore, when the induction coil is used to supply power, a wireless communication channel (such as infrared. Bluetooth, radio frequency identification (RFID) or WiFi communication channel, etc) is established separately. However, adding wireless communication devices into the existing induction type power supply system will lead to increase of manufacturing cost for the system.

When induction type power coils are used to transmit data, one problem that should be noticed is how to transmit and receive data synchronously. Like the method of transmitting data over RFID, the method of transmitting data over supplying-end coil is operated in the way that the supplying-end coil transmits the main carrier to the receiving-end coil and the receiving-end circuit feeds back by controlling load changes. In existing design of induction type power supply systems, power energy and data are transmitted in unidirectional way, i.e. the power energy (If main oscillating carrier transmitted from the supplying-end coil) is transmitted from the supplying-end module to the receiving-end module, while the data code is fed from the receiving-end module to the supplying-end module. But the receiving-end module only receives energy that is either strong or weak from the supplying-end module without emitting data signals of communication actively, and can feed back only after getting close to the supplying-end module and receiving power. And the supplying-end module cannot transmit data codes if not supplying power energy, so there are still considerable limitations and inconveniences in use of the induction type power supply system.

Refer to FIGS. 1 and 2, which illustrate the structure of receiving power and data feedback of the receiving-end module. As shown in these figures, there are two types of structural design for this purpose: resistance type and capacitance type. The resistance type modulation of feedback signals originates from the passive RFID technology, which relies on resistance of the receiving-end coil to switch feedback signals to the supplying-end coil for reading, as applied in a wireless charging system disclosed in US Patent Publication No. 20110273138, entitled Wireless Charging System (Taiwan Patent Publication No. 201018042, entitled Wireless Charging System) filed by Access Business Group (Fulton). According to this invention, the load resistor of the switch placed on the rear side of the receiving rectifier, or Rcm in FIG. 1, is used to make changes in impedance characteristics on the receiving-end coil that is fed back to the supplying-end coil. These changes will be analyzed by the detection circuit on the supplying-end coil, and then decoded by the software installed in the processor of the supplying-end module.

Referring to FIGS. 3 and 4, FIG. 3 illustrates the signal status on the supplying-end coil. When the Rcm switch is closed, it will cause the impedance on the receiving-end coil to drop down, making the amplitude on the supplying-end coil increase after feeding back to the supplying-end coil. Then the asynchronous serial format in UART communication mode is used for encoding, i.e. to interpreting logic data codes by determining whether the modulation status changes at this time point in a fixed time cycle. However, this way of encoding may result in a problem that modulation load is kept switching on within a cycle time.

Refer to FIGS. 5 and 6, which illustrate the data transmission format in qi specifications. These figures show a data transmission frequency modulated and demodulated with the 2 KHz timing frequency. It can be worked out that the longest duration of modulation load conduction is a cycle in a signal feedback. In UARI communication mode, the duration of modulation load conduction does not affect system functions. In induction type power supply system, however, the state of modulation load conduction will affect the state of power supply, because the main carrier at the supplying-end is used to supply power and can transmit strong current drive force due to the coupling effect of the supplying-end module and receiving-end module. But the resistor load at the receiving-end module needs to withstand feedback drive currents; when power increases, the power to be withstood at Rcm will increase, too. Besides, in the process of modulation, the electric currents that originally go to the receiving-end module for output will be shunted by Rcm, thus reducing the output capability at the receiving-end module. Moreover, signals are easy to recognize only when the cycle time for signal modulation is far less than that of transmission frequency. As main carrier waves in induction type power supply system can only operate at a lower frequency (roughly 100-200 KHz) as a result of components' performance restraints or in accordance with laws and regulations electromagnetic interference, while data transmission depends on modulation of main carrier waves, the data transmission frequency must be far lower than the main carrier wave frequency to ensure smooth operation. Due to the conflict of the above conditions, when the power of induction type power supply system is increased, data modulation with resistor loads will not work any more.

Since signal modulation loads need to absorb considerably large electric currents and it leads to the problem of power loss following power increases, making it impossible to use this method, some firms propose a new method of capacitive signal modulation. In US Patent Publication No. 20110065398, entitled Universal Demodulation And Modulation For Data Communication In Wireless Power Transfer by Hongkong-based Convenient Power HK Ltd (referring to FIGS. 7 and 8), capacitors and switches are added at the receiving-end module to feed signals to the supplying-end module and generate changes in the voltage, current and input on the supplying-end coil, and data signals are identified through analysis of these three variables of signals. The shortcoming of this method lies in that all three variables are so weak that several amplification circuits are needed for analysis, making the circuit cost increase significantly.

As shown in FIGS. 9-13, coil amplitudes or coil output power will increase during signal modulation to enable the analysis circuit to identify the amount of variance and transmit it to the microprocessor for analysis. In the figure of analysis amplification, when the amplitude of the induction type power supply system reaches Point A, it will increase to Point B following signal modulation, and may increase to Point C or D if the modulation energy increases (low resistance is used at Rcm in the previous example). In the induction type power supply system, the amplitude changes with the load state at the receiving-end module. Under the condition of high power output, the amplitude may operate at Point C or D, and may move to Point E if signals are modulated under such circumstance. This can be seen as an overload reaction, and at this time, the power supply system will lose the capability to increase amplitudes through signal modulation to transmit data, which may lead to the system failure. In light of this limitation, the induction type power supply system is designed to make its amplitude reach a lower position of Point A or B with low power output. When the output power is increased, the amplitude needs to be increased to Point C or D, resulting in system failure.

Therefore, to solve this problem, all firms that engage in this field focus on how to increase the power for the induction type power supply system.

SUMMARY OF THE INVENTION

In order to solve the above problem, the present invention provides an operating clock synchronization adjusting method, for an induction type power supply system, capable of automatically calibrating and synchronizing timers in a supplying-end and receiving end, resisting noise and allowing timings of transmitting data signal to be accurate.

The present invention discloses an operating clock synchronization adjusting method, for an induction type power supply system. The operating clock synchronization adjusting method comprises receiving a plurality of data pulses, by a supplying-end module, according to a clock of a microprocessor of the supplying-end module, for generating a plurality of data frames; calculating a period between first data pulses corresponding to starting bits of a first data frame and a second data frame among the plurality of data frames, for acquiring a data frame period; calculating a period between the first data pulse of the second data frame and a second data pulse of the second data frame, for acquiring a bit period; and comparing the bit period and a bit time threshold, for determining whether to adjust the clock of the microprocessor according to the data frame period and a frame time threshold.

The present invention further discloses a synchronous data transmitting method for an induction type power supply system. The synchronous data transmitting method comprises receiving, by a supplying-end of the induction type power supply system, a plurality of data impulses of a power transmitting signal according to a first operating clock of a microprocessor in the supplying-end, for generating a plurality of data frames, wherein the plurality of data impulses is transmitted by a receiving-end according to a second operating clock of a microprocessor in a receiving-end of the induction type power supply system; calculating time periods between data impulses corresponding to start bits of the plurality of data frames, for acquiring a plurality of data frame periods; comparing the plurality of data frame periods with a data frame time period, for synchronizing the first operating clock and the second operating clock; and turning on a receiving function of the supplying-end in a plurality of receiving periods and turning off the receiving function in a plurality of closed periods, wherein the plurality of receiving periods corresponds to the plurality of data impulses.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
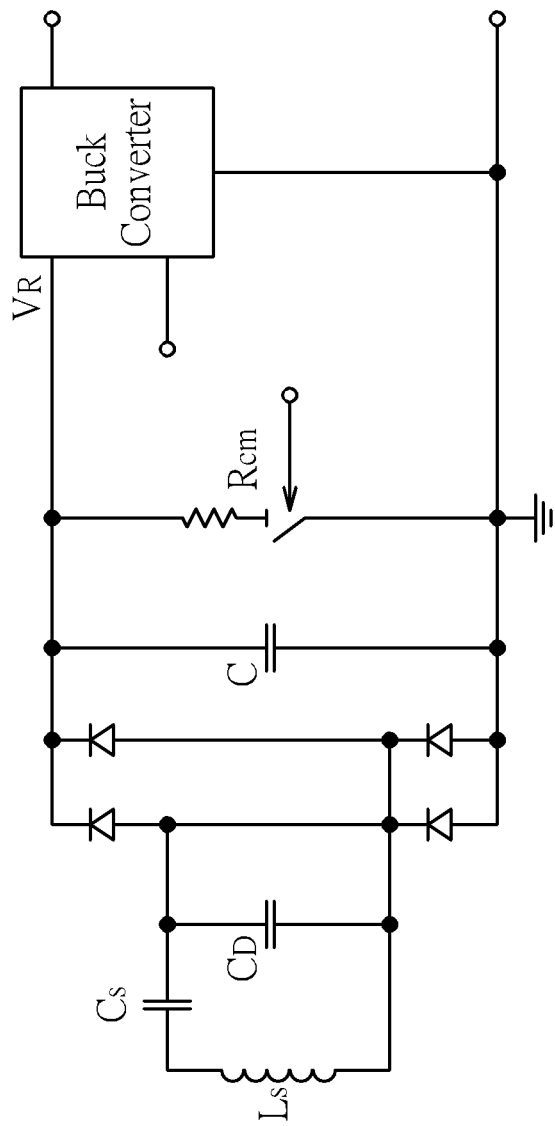
FIG. 1 and FIG. 2 are schematic circuit diagrams of the structure of receiving power and feedback by the receiving-end module according to conventional Qi specifications.
Figure 2:
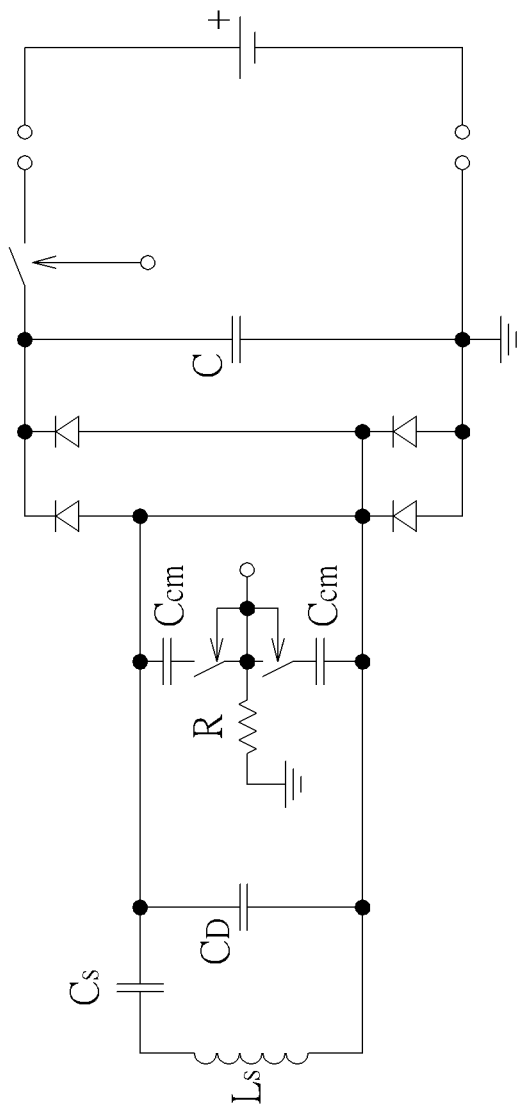
Figure 3:
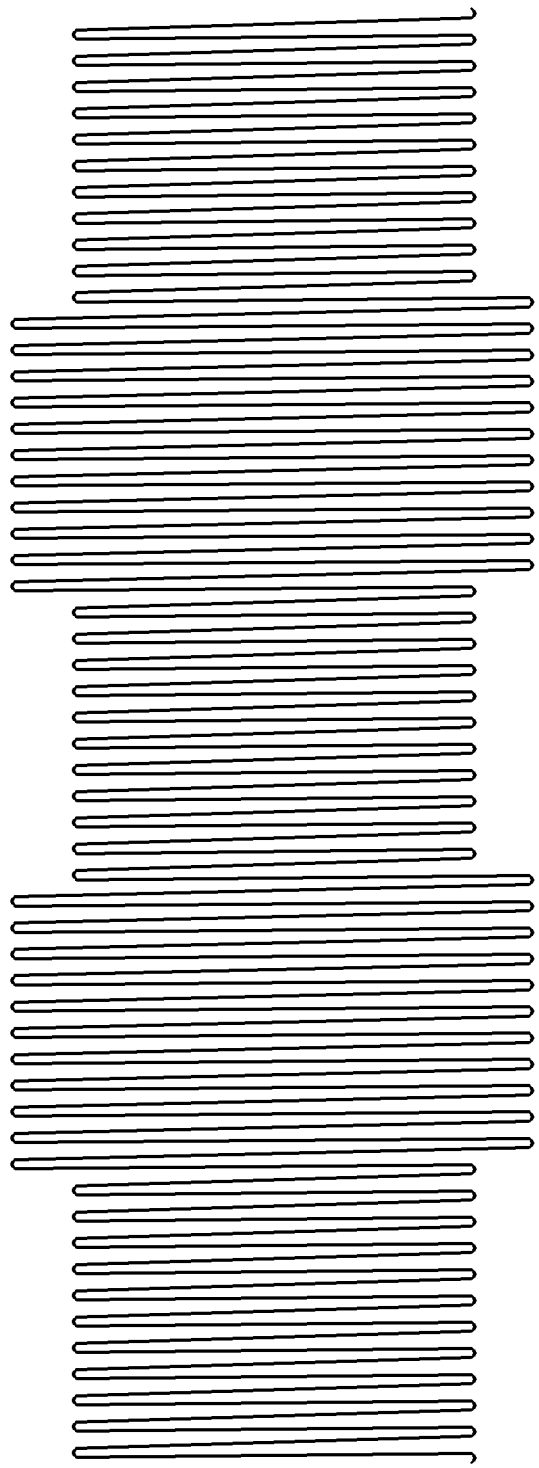
FIG. 3 and FIG. 4 illustrate a signal in a conventional induction type power supply system disclosed in US Patent Publication No. 20110273138.
Figure 4:
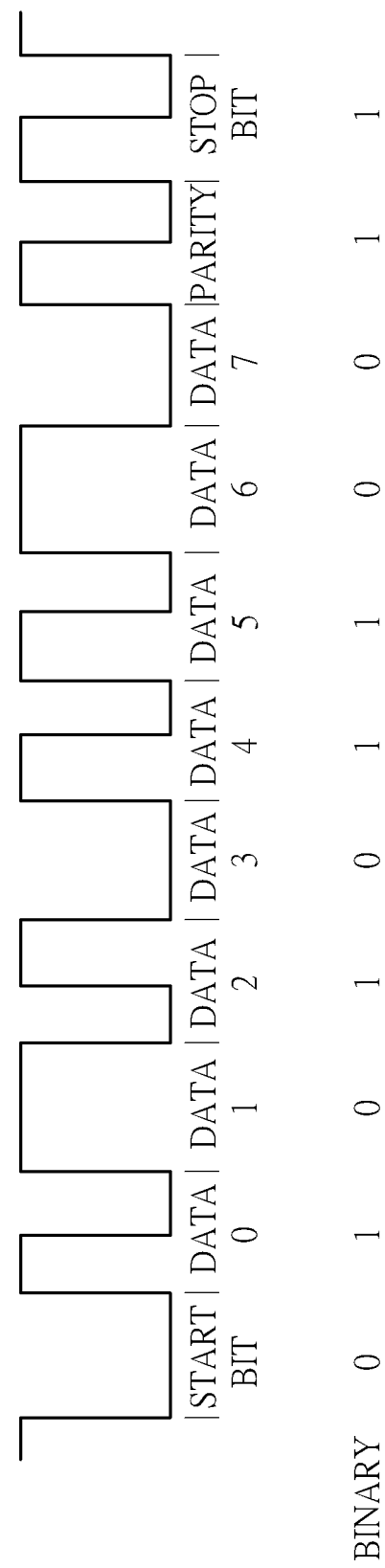
Figure 5:
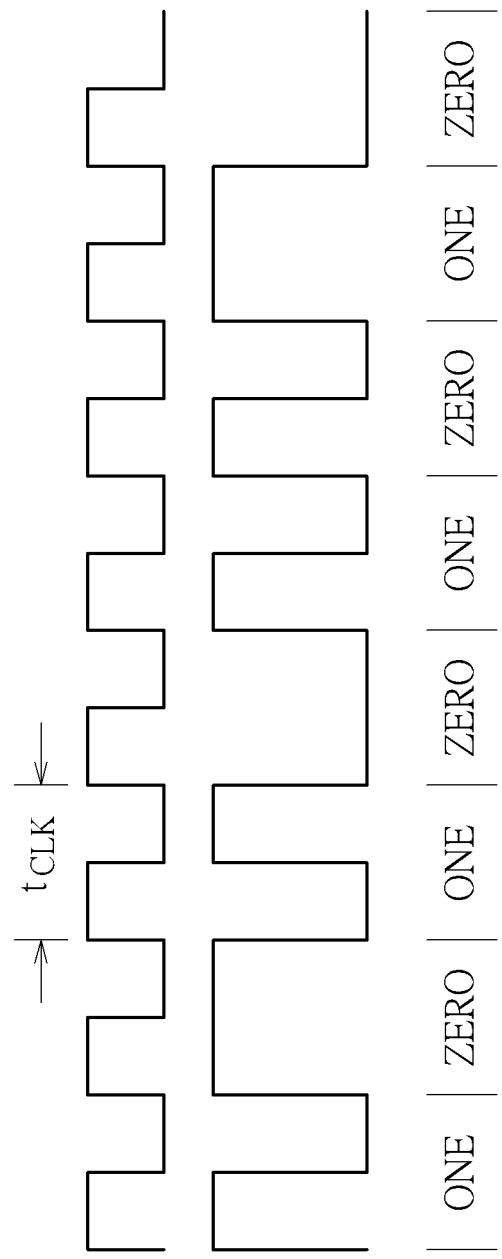
FIG. 5 and FIG. 6 illustrate the data transmission format according to the conventional Qi specifications.
Figure 6:
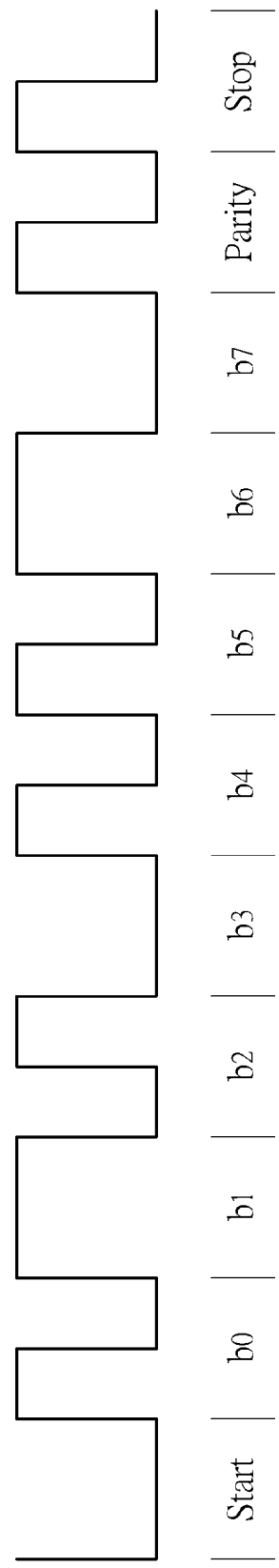
Figure 7:
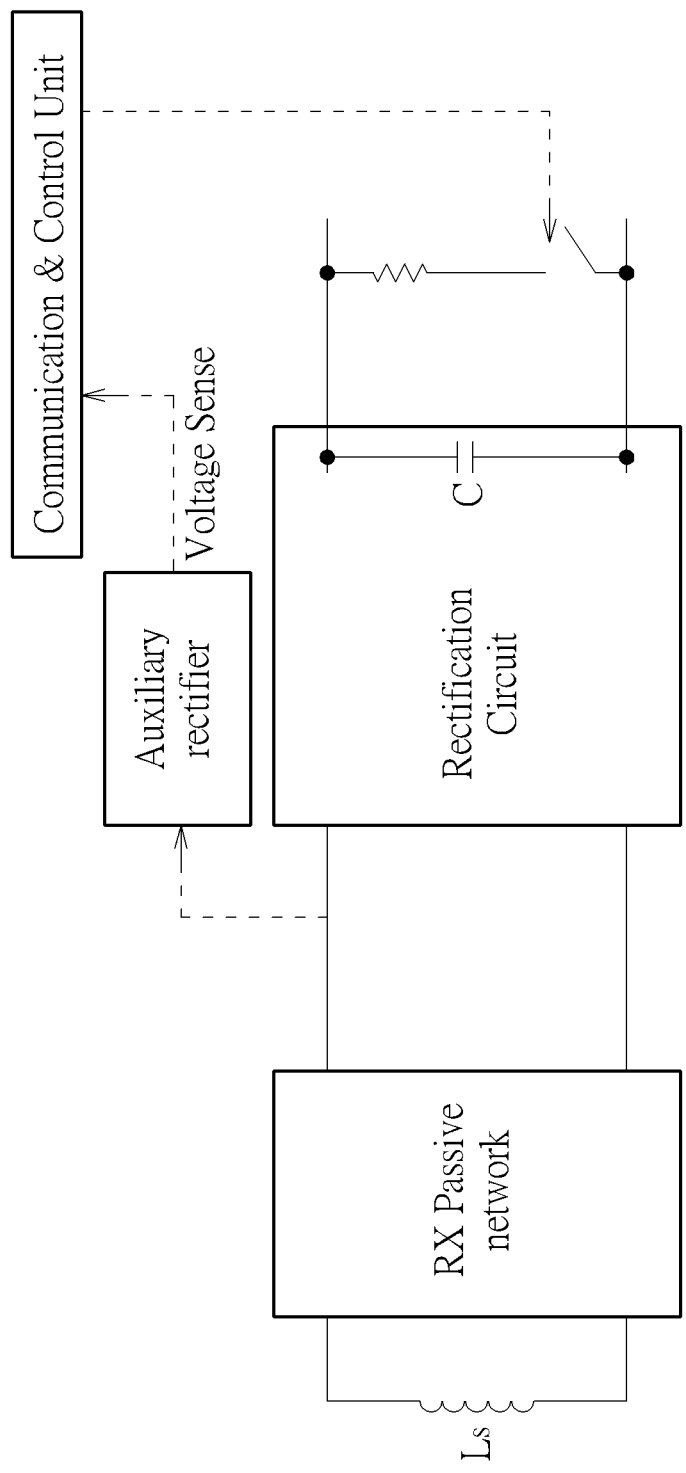
FIG. 7 and FIG. 8 are schematic circuit diagrams of data modulation and demodulation in the wireless power transfer disclosed in US Patent Publication No. 20110065398.
Figure 8:
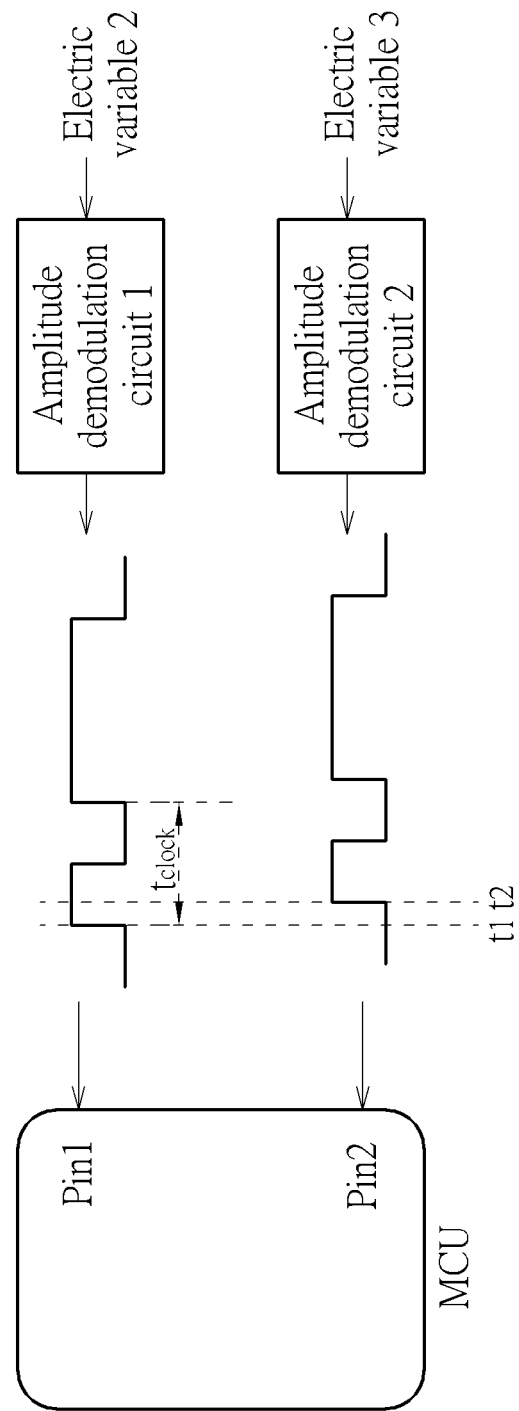
Figure 9:
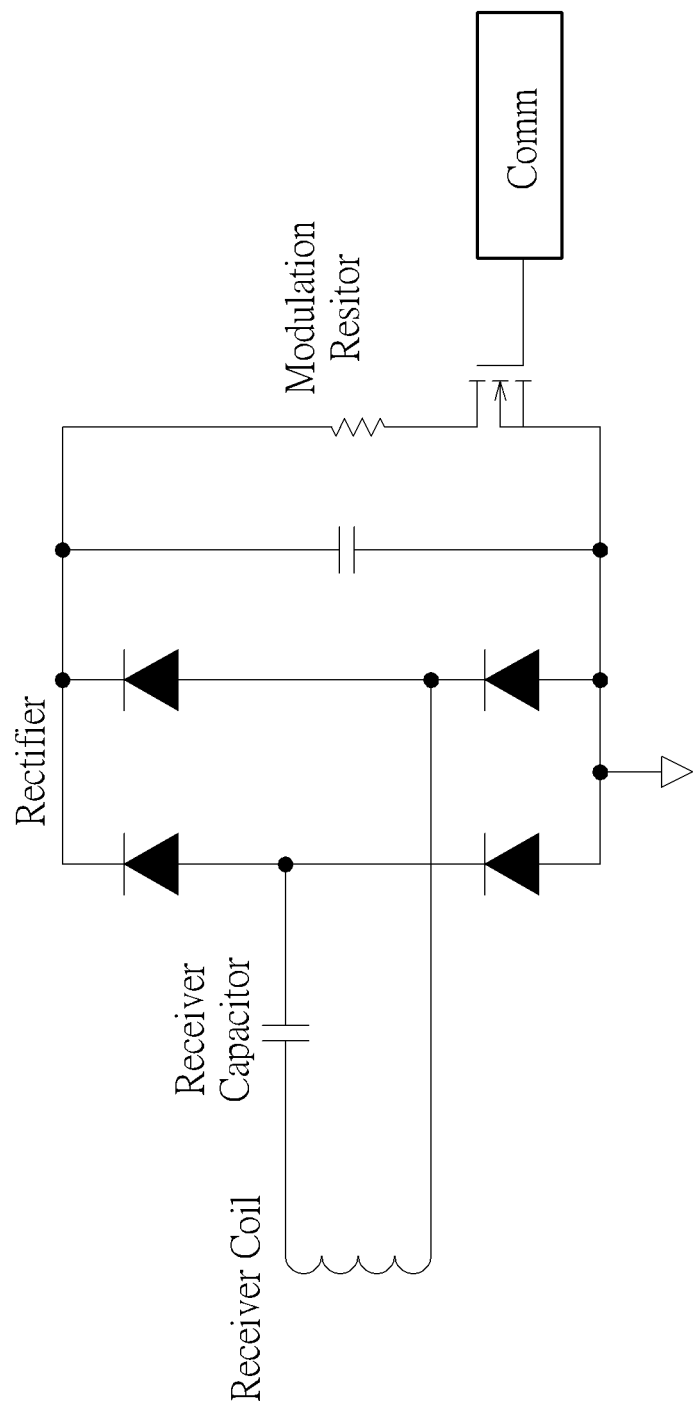
FIG. 9 is a circuit diagram of resistor type signal modulation in conventional Ti specifications.
Figure 10:
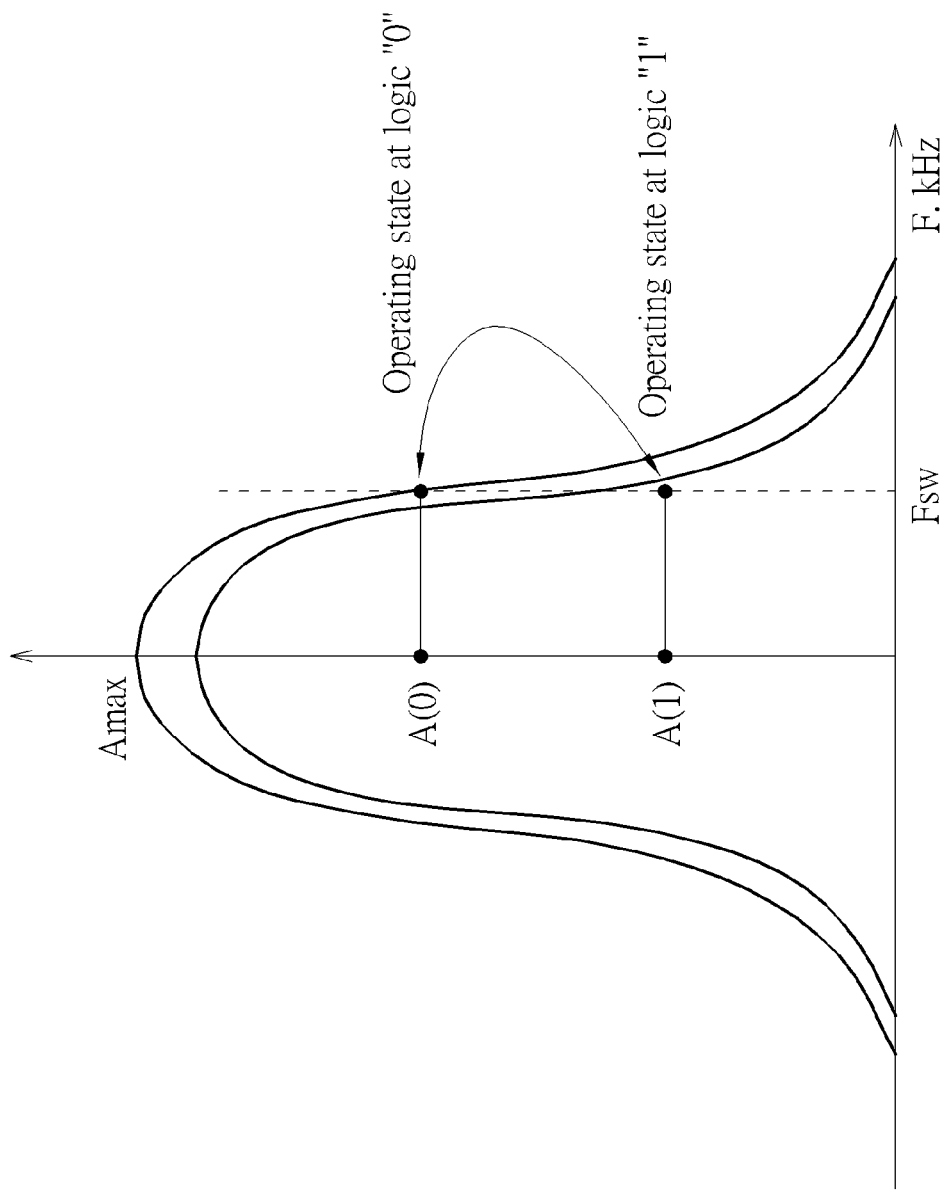
FIG. 10 is a waveform of resistor type signal modulation in conventional Ti specifications.
Figure 11:
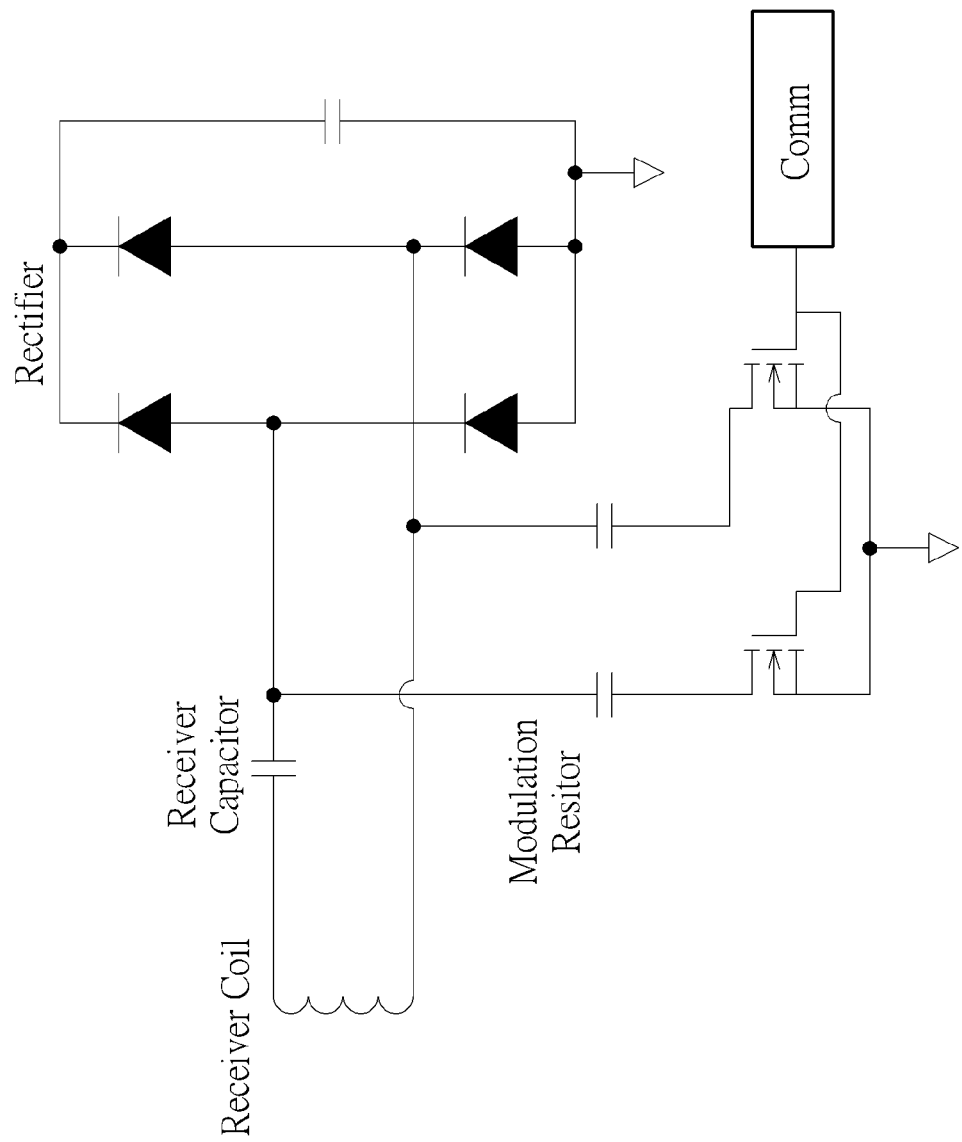
FIG. 11 is a circuit diagram of capacitor type signal modulation in conventional Ti specifications.
Figure 12:
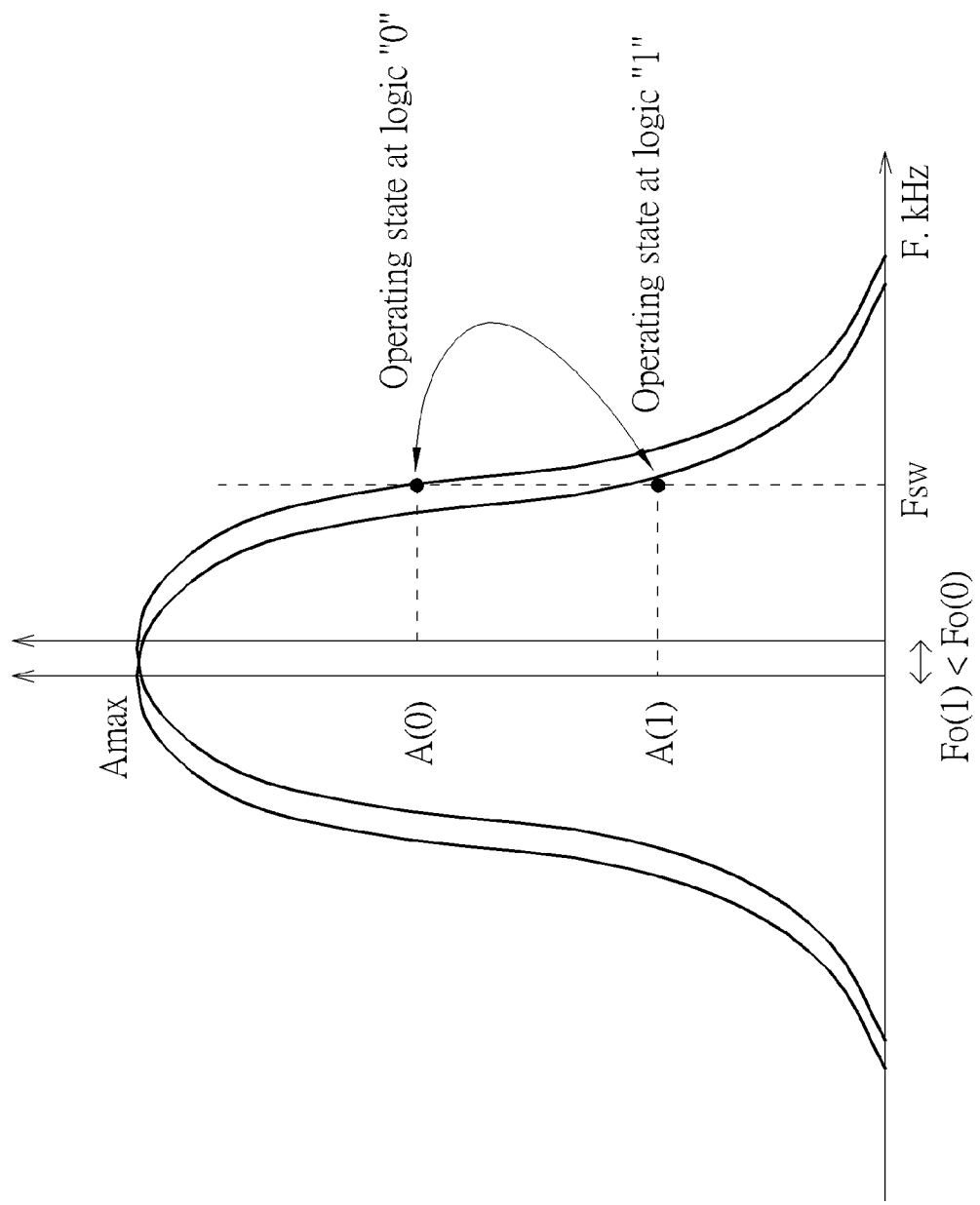
FIG. 12 is a waveform drawing of capacitor type signal modulation in conventional Ti specifications.

To achieve the aforesaid objects and functions as well as the techniques adopted in the present invention and its fabrication, examples of the preferred embodiment of the present invention are given below to illustrate its features and functions in detail by referring to the accompanying drawings.

Referring to FIGS. 14A, 14B, 15-25, an induction type power supply system disclosed in the present invention includes a supplying-end module 1 and a receiving-end module 2. A method of transmitting power and data signals from said modules to a preset electronic device comprises the steps of:

Step 1400: Starting program initialization by a supplying-end microprocessor and setting the timing length of the trigger pulse, start bit, logic state, end bit and data transmission loop and other functions following supply of power from a power source 161 of a power supply unit 16 in the supplying-end module 1.

Step 1401: Selling the detection signal output frequency by a supplying-end microprocessor 11 with the frequency converter program and then stopping output frequency to a power driver unit 12.

Step 1402: Starting a standby timer by the supplying-end microprocessor 11 and entering into the sleeping and power-saving state after shutting down the output, and waking up upon completion of timing.

Step 1403: Starting and transmitting the detection signal by the supplying-end microprocessor 11 upon completion of standby timing to activate the receiving-end module 2 close to a supplying-end coil 171 and then starting a voltage comparator installed in the supplying-end microprocessor 11.

Step 1404: Starting to count the detection time and detecting if there is a trigger signal on the signal analysis circuit 13 through the voltage comparator in the supplying-end microprocessor 11; proceeding to step 1405 if there is no trigger signal; otherwise, proceeding to step 1407.

Step 1405: Deciding that there is no receiving-end module 2 close to the supplying-end module 1 if no trigger signal is found by the supplying-end microprocessor 11 in the detection period and preparing to enter into standby mode.

Step 1406: Detecting the signal from a coil voltage detection circuit 14 by the supplying-end microprocessor 11 and checking if the voltage falls within the set range; proceeding to step 1401 to reset the detection signal output frequency if the voltage does not fall within the set range; otherwise, proceeding to step 1402 and shutting off the output.

Step 1407: Transmitting a trigger signal from the timer installed in the supplying-end microprocessor 11 to examine the signal check flag and determine if the first trigger signal is delivered, proceeding to step 1408 if no, otherwise proceeding to step 1410.

Step 1408: Deciding that the receiving-end module 2 gets close to the supplying-end coil 171 according to the first trigger signal and extending the detection signal transmission time by the supplying-end microprocessor 11 to continuously transmit power to the receiving-end module 2 through the supplying-end coil 171 and make it operate.

Step 1409: Marking the signal check flag as an issued trigger signal by the supplying-end microprocessor 11, starting the trigger signal timer to get ready for detecting the next trigger and proceeding to step 1404.

Step 1410: Sending a trigger signal from the timer of the supplying-end microprocessor 11 and checking if the start bit length is confirmed; proceeding to step 1411 if the start bit length is not confirmed: otherwise, proceeding to step 1412.

Step 1411: Checking by the supplying-end microprocessor 11 if the issue time of the current trigger signal and time length of the first trigger signal conform with the range of the start bit length; proceeding to step 1412 if yes, and proceeding to step 1413 if not.

Step 1412: Marking the start bit flag as confirmation completed by the timer of the supplying-end microprocessor 11, resetting and restarting the trigger signal timer to get ready for detecting the next trigger and continuing to implement step 2911.

Step 1413: Deciding that no desired receiving-end module 2 is getting close by the supplying-end module 11 according to that the start bit signal length does not comply with the set value, getting ready for shutting down the output and proceeding to step 1405.

Figure 25A:
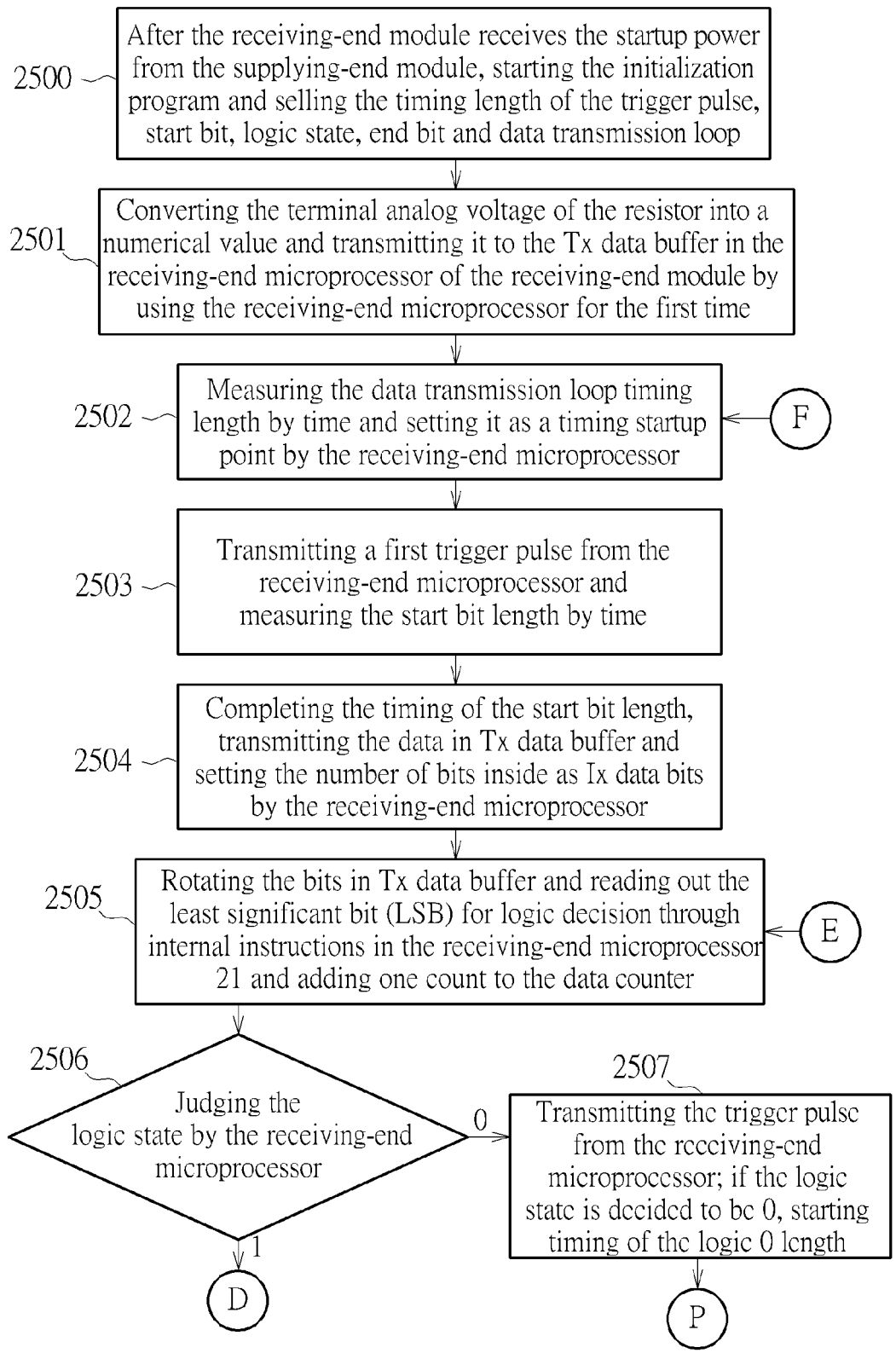
FIG. 25A and FIG. 25B are operation flow charts of the receiving-end module after receiving power in accordance with the present invention.
Figure 25B:
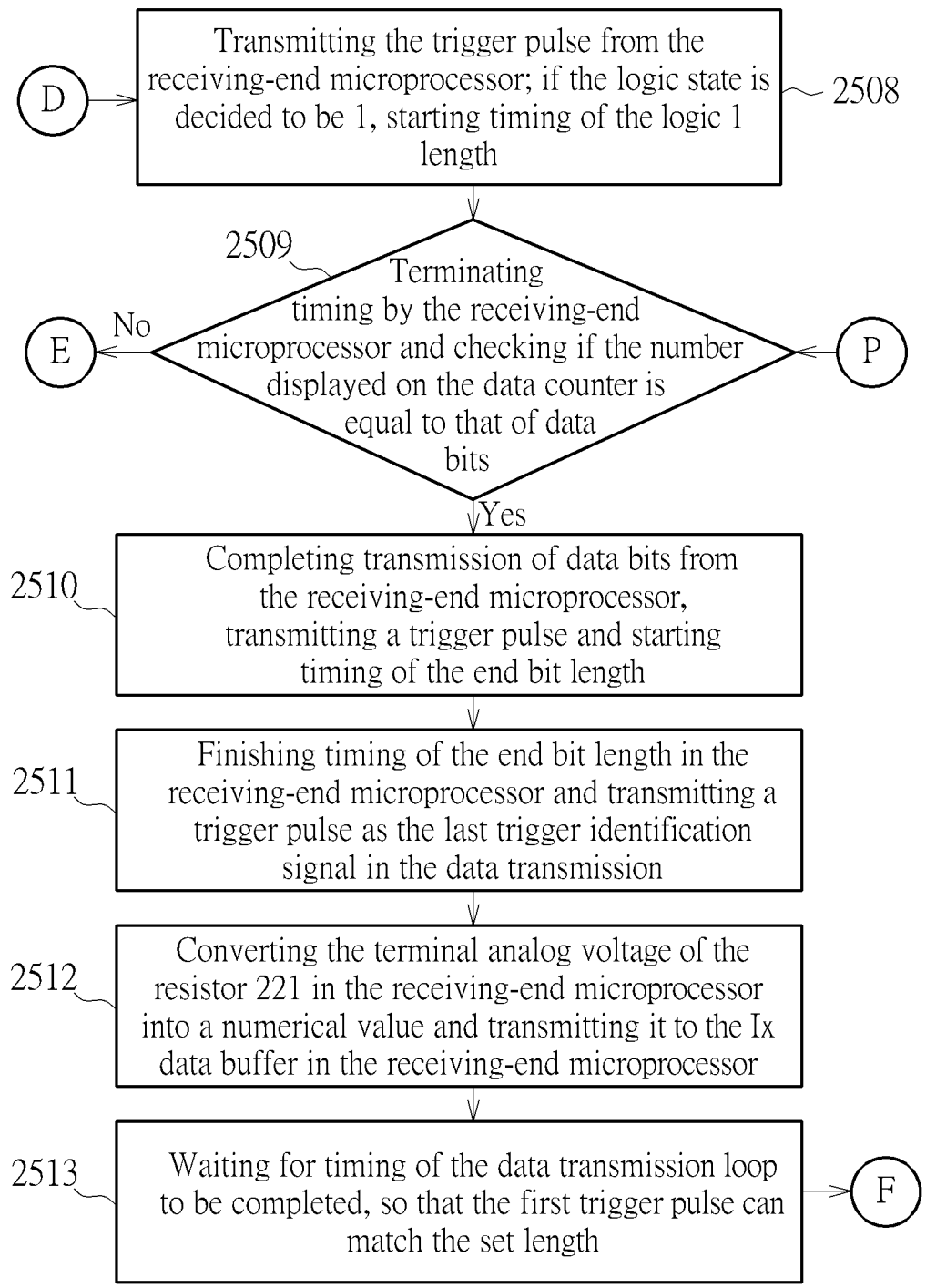
Figure 26:
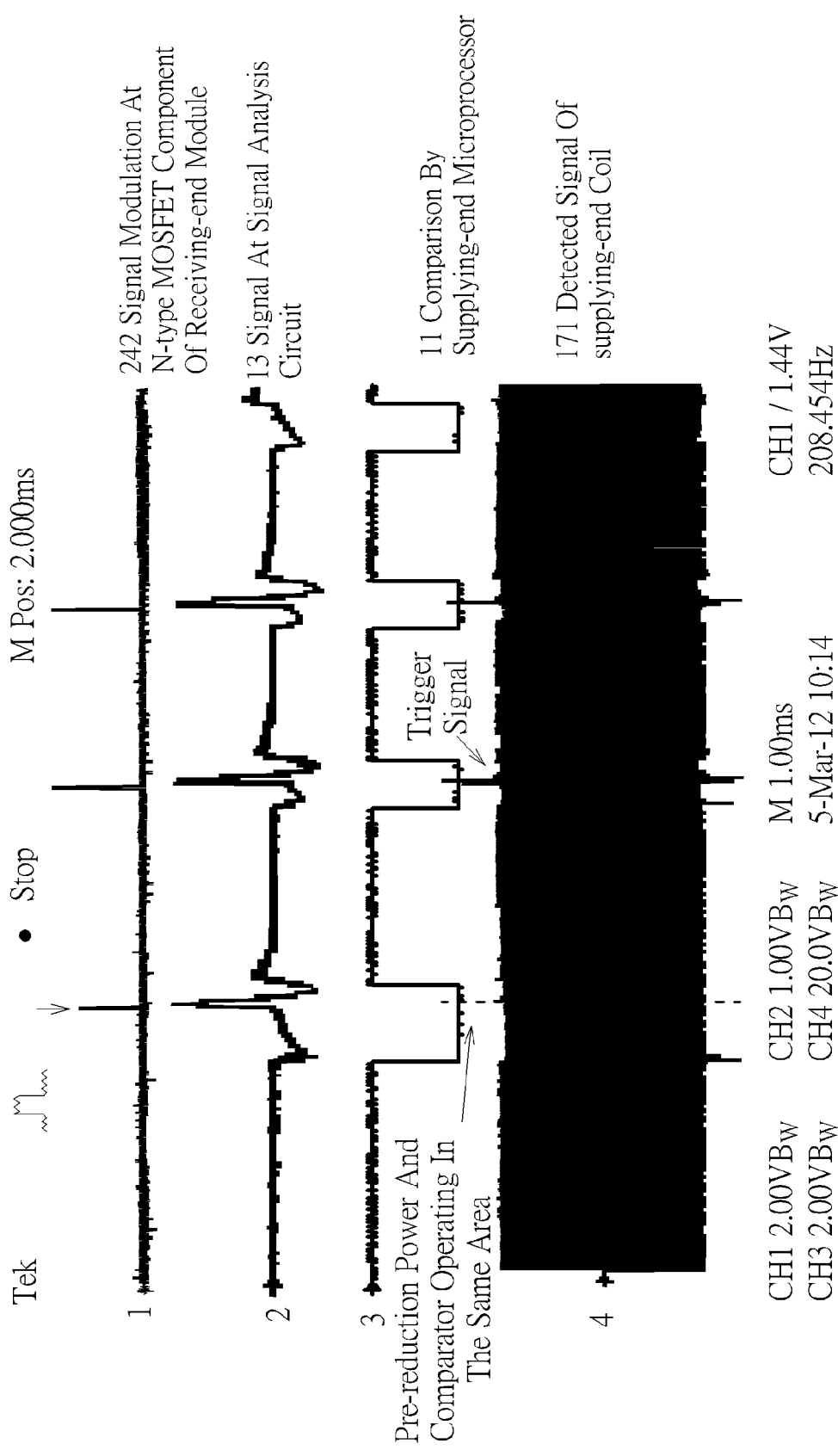
FIG. 26 and FIG. 27 are presentations of power pre-reduction of the supplying-end coil signals in accordance with the present invention.
Figure 27:
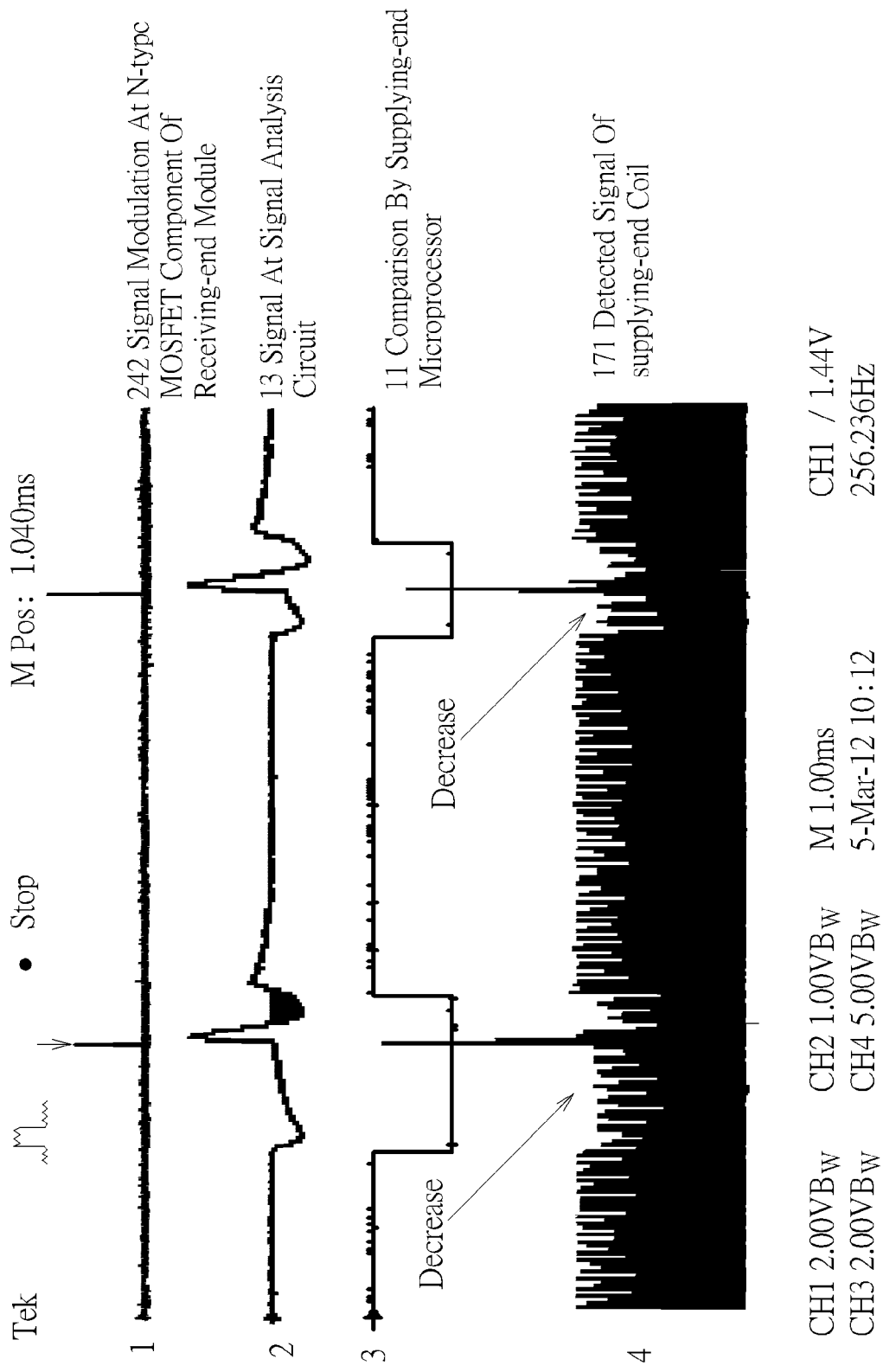
Figure 28:
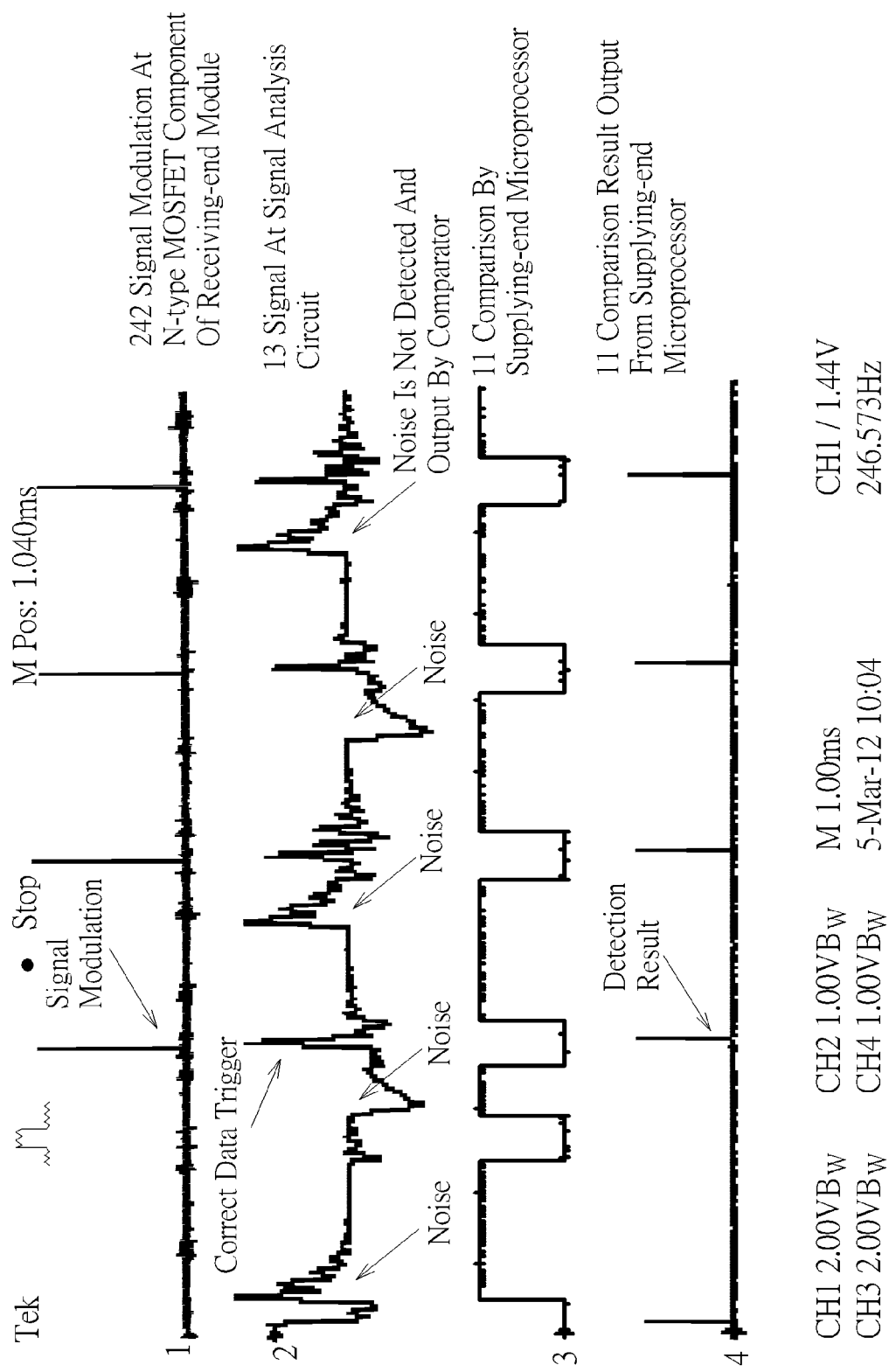
FIG. 28 illustrates a signal processed with anti-noise method in accordance with the present invention.
Figure 29A:
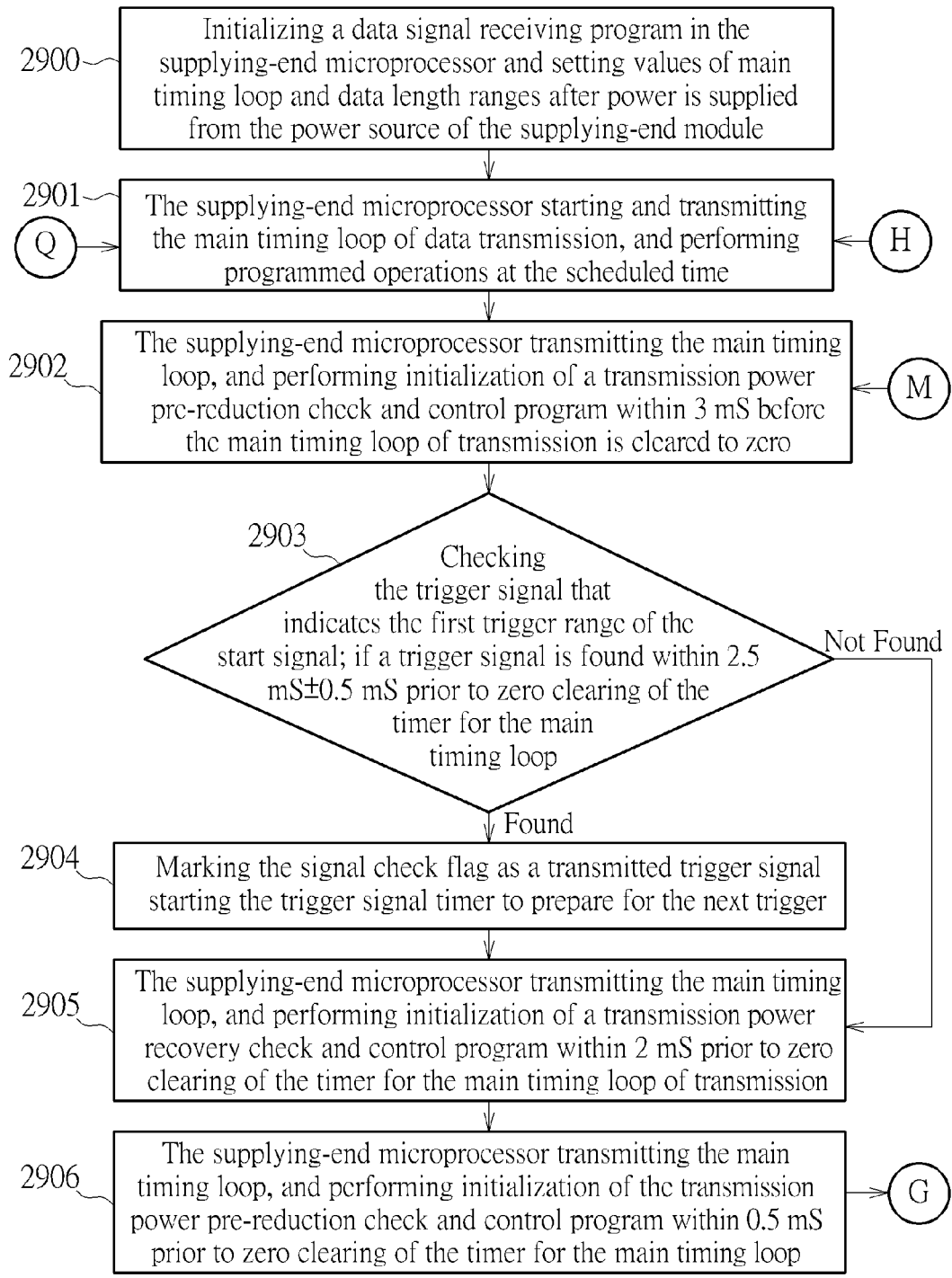
FIGS. 29A-29E are operation flow charts for synchronous power supply and data transmission in accordance with the present invention.
Figure 29B:
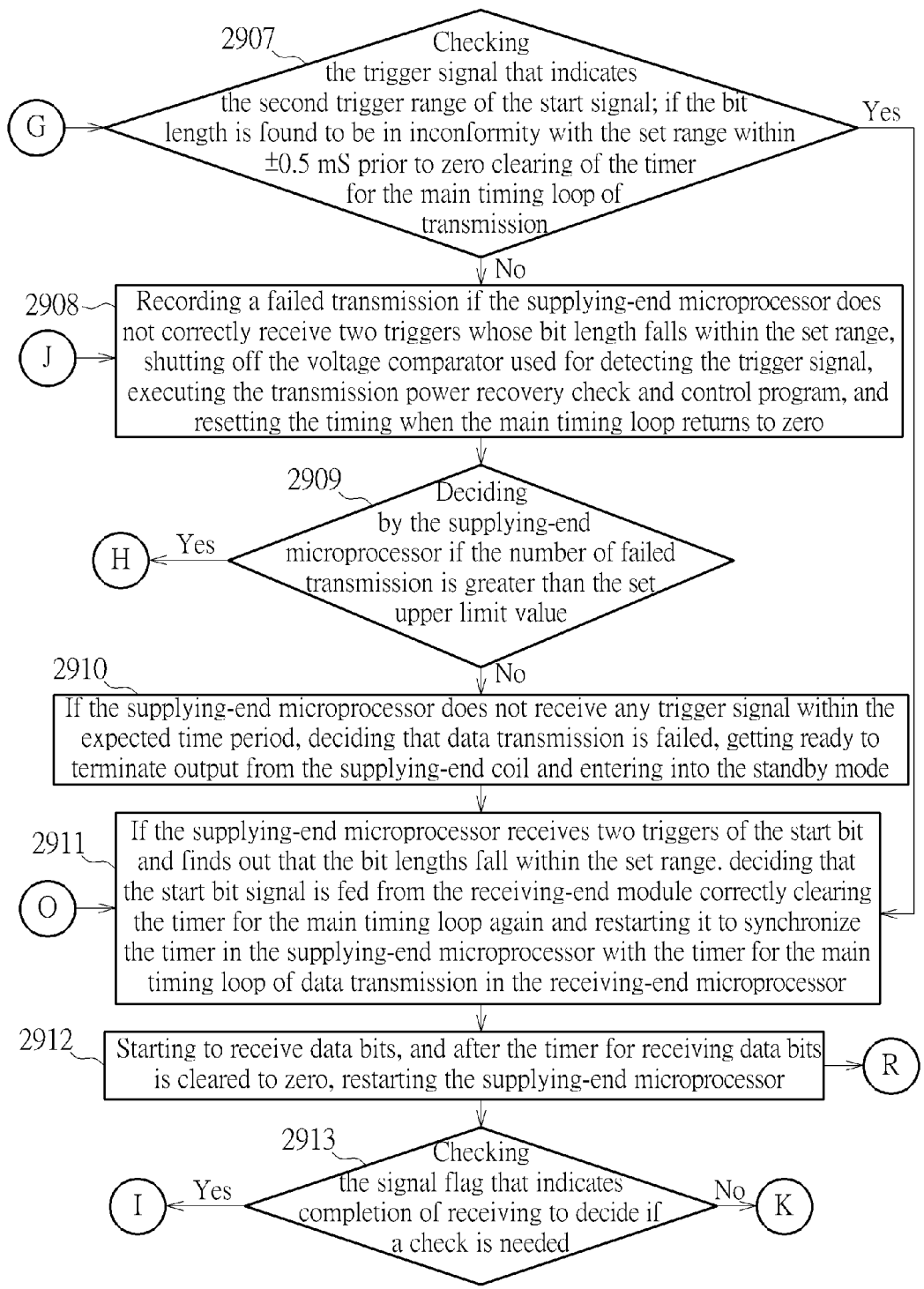
Figure 29C:
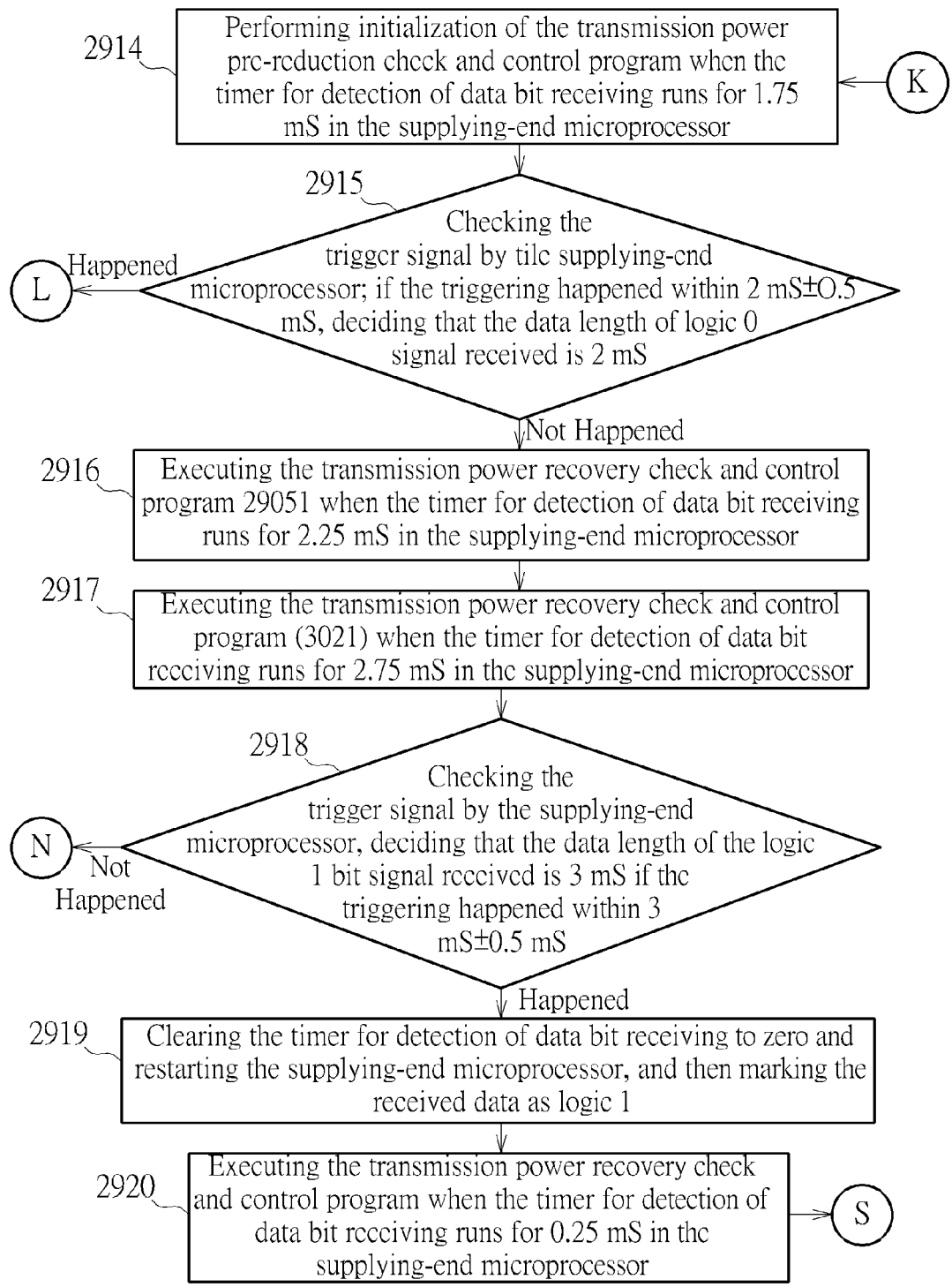
Figure 29D:
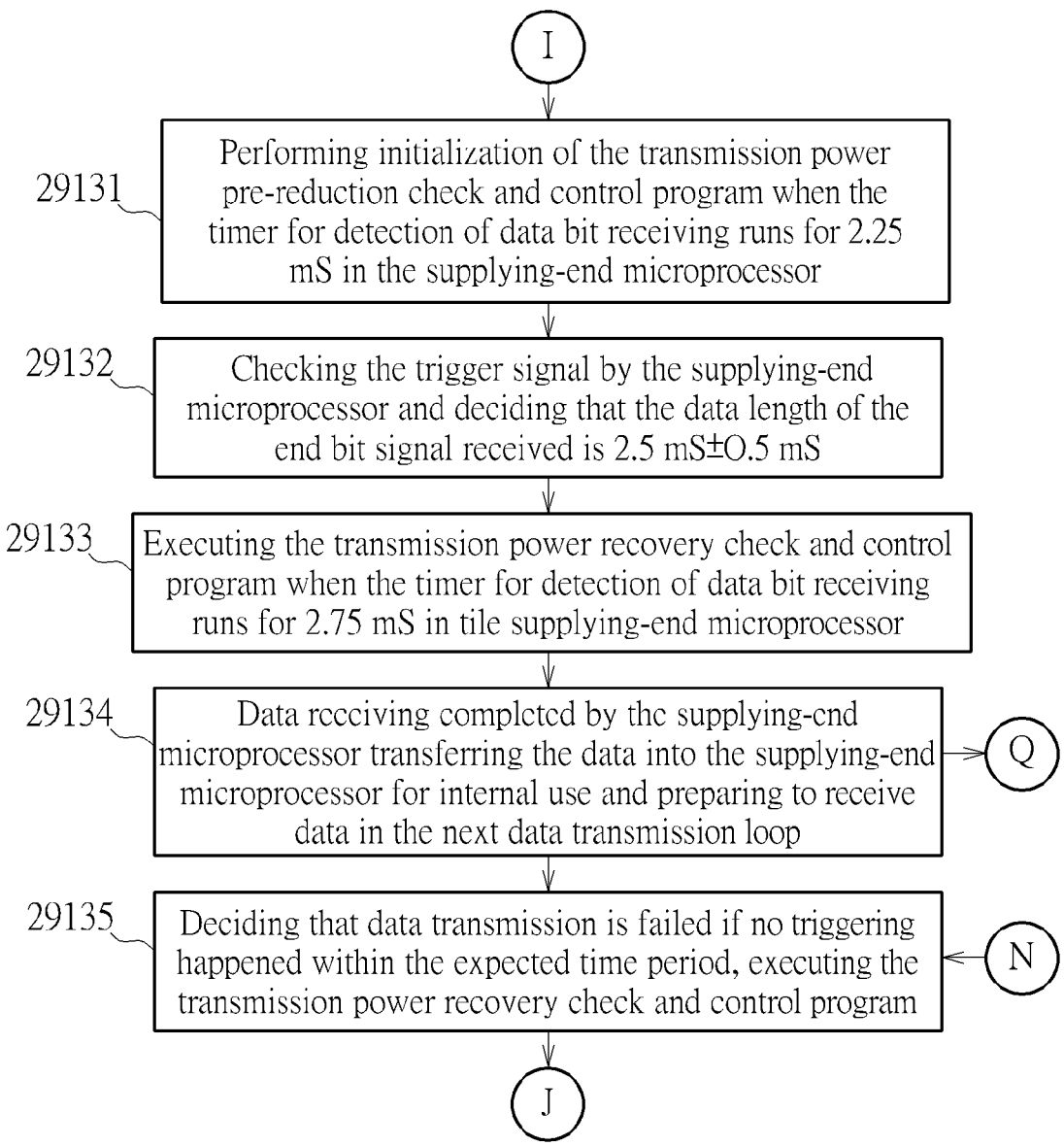
Figure 29E:
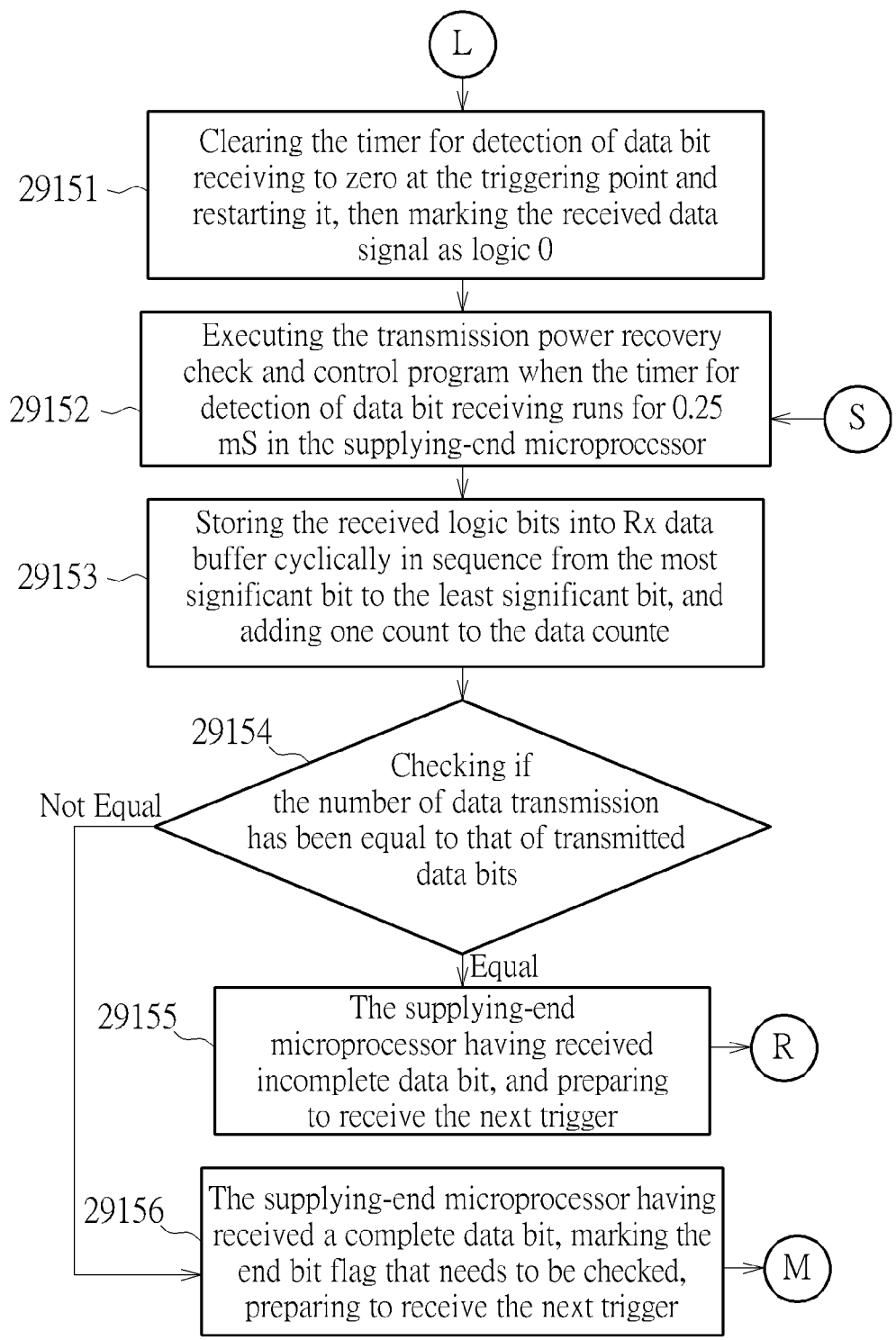

Please jointly refer to FIGS. 25A, 25B, 26-28. FIG. 25A and FIG. 25B are operation flow charts of the receiving-end module after receiving power in accordance with the present invention. FIG. 26 and FIG. 27 are presentations of power pre-reduction of the supplying-end coil signals in accordance with the present invention. FIG. 28 illustrates a signal processed with anti-noise method in accordance with the present invention. As shown in FIG. 25A and FIG. 25B, after receiving the power from the supplying-end module 1, the receiving-end module 2 implements the steps of:

Step 2500: After the receiving-end module 2 receives the startup power from the supplying-end module 1, starting the initialization program and selling the timing length of the trigger pulse, start bit, logic state, end bit and data transmission loop.

Step 2501: Converting the terminal analog voltage of the resistor 221 into a numerical value and transmitting it to the Tx data buffer in the receiving-end microprocessor 21 of the receiving-end module 2 by using the receiving-end microprocessor 21 for the first time.

Step 2502: Measuring the data transmission loop timing length by time and setting it as a timing startup point by the receiving-end microprocessor 21 (50 mS, for example).

Step 2503: Transmitting a first trigger pulse from the receiving-end microprocessor 21 and measuring the start bit length by time (2.5 mS, for example).

Step 2504: Completing the timing of the start bit length, transmitting the data in Tx data buffer and setting the number of bits inside as Ix data bits by the receiving-end microprocessor 21.

Step 2505: Rotating the bits in Tx data buffer and reading out the least significant bit (LSB) for logic decision through internal instructions in the receiving-end microprocessor 21 and adding one count to the data counter.

Step 2506: Judging the logic state by the receiving-end microprocessor 21; proceeding to step 2507 if the logic state is 0, or proceeding to step 2508 if the logic state is 1.

Step 2507: Transmitting the trigger pulse from the receiving-end microprocessor 21; if the logic state is decided to be 0, starting timing of the logic 0 length and proceeding to step 2509 (2 mS, for example).

Step 2508: Transmitting the trigger pulse from the receiving-end microprocessor 21; if the logic state is decided to be 1, starting timing of the logic 1 length and proceeding to step 2509 (3 mS, for example);

Step 2509: Terminating timing by the receiving-end microprocessor 21 and checking if the number displayed on the data counter is equal to that of data bits; proceeding to step 2510 if yes and proceeding to step 2505 if not.

Step 2510: Completing transmission of data bits from the receiving-end microprocessor 21. transmitting a trigger pulse and starting timing of the end bit length (2.5 mS, for example).

Step 2511: Finishing timing of the end bit length in the receiving-end microprocessor and transmitting a trigger pulse as the last trigger identification signal in the data transmission.

Step 2512: Converting the terminal analog voltage of the resistor 221 in the receiving-end microprocessor 21 into a numerical value and transmitting it to the Ix data buffer in the receiving-end microprocessor 21.

Step 2513: Waiting for timing of the data transmission loop to be completed, so that the first trigger pulse can match the set length (for example, 50 mS) and proceeding to step 2502 before the start bit is transmitted in every data transmission.

Moreover, the induction type power supply system disclosed iii the present invention comprises a supplying-end module 1 and a receiving-end module 2.

The supplying-end module 1 includes a supplying-end microprocessor 11, in which operation and control programs, signal analysis software programs with anti-noise function and other related software programs, a timer used for timing of signal pulse spacing length and a voltage comparator used to detect pulse signal triggering are built. The supplying-end microprocessor 11 is electrically connected with a power drive unit 12, a signal analysis circuit 13, a coil voltage detection circuit 14, a display unit 15 and a power supply unit 16 respectively. The power drive unit 12 has a MOSFET driver 121 connected with the supplying-end microprocessor 11, a high-side MOSFET component 122 and a low-side MOSFET component 123 respectively, where both MOSFET components are connected to a resonant circuit 17, and the high-side MOSFET component 122 is further connected with the power supply unit 16 electrically. The signal analysis circuit 13 comprises a rectifier diode 133 electrically connected to the resonant circuit 17, a plurality of resistors 131 electrically connected in series to the rectifier diode 133, and a plurality of capacitors 132 connected in parallel to the series of resistors 131. The power supply unit 16 comprises a power source 161, a detection divider resistor 162 and a detection divider resistor 163 connected in series and a direct current (DC) step-down transformer 164, and is connected with the power drive unit 12. The resonant circuit 17 is connected with a supplying-end coil 171 capable of transmitting power and receiving data signals.

The receiving-end module 2 includes a receiving-end microprocessor 21, in which operation, control and related software programs and a timer used for timing of transmitted signal pulse spacing length are installed. The receiving-end microprocessor 21 is connected with a voltage detection circuit 22, a rectifier and filter circuit 23, an amplitude modulation circuit 24, a breaker protection circuit 25, a voltage stabilizing circuit 26 and a direct current (DC) step-down transformer 27 respectively. The voltage detection circuit 22 has a plurality of resistors 221 connected electrically in series to the receiving-end microprocessor 21 and detection points 222 electrically connected with the resistors 221, the rectifier and filter circuit 23, the breaker protection circuit and the DC step-down transformer 27 respectively. The rectifier and filter circuit 23 includes a rectifier 231 and a capacitor 232 that are respectively connected in parallel with the voltage detection circuit 22, the breaker protection circuit 25 and the DC step-down transformer 27, and the rectifier 231 is connected in parallel with the resonant circuit 28 and a receiving-end coil 281 through the rectifier 231. The receiving-end coil 281 is connected in series with the amplitude modulation circuit 24. The amplitude modulation circuit 24 comprises a resistor 241 and an N-type MOSFET component 242 connected in series to the resistor 241. The breaker protection circuit 25 includes a resistor 251, a P-type MOSFET component 252 and an N-type MOSFET component 253, of which the N-type MOSFET component 253 is utilized to electrically connect to the receiving-end microprocessor 21. Resides, the P-type MOSFET component 252 is electrically connected with a buffer capacitor 261 and a DC step-down transformer 262 linked electrically with a power output terminal 263 on the voltage stabilizing circuit 26. Furthermore, the voltage detection circuit 22, breaker protection circuit 25, voltage stabilizing circuit 26 and DC step-down transformer 27 are electrically connected to the receiving-end microprocessor 21 respectively, and the voltage detection circuit 22, breaker protection circuit 25 and DC step-down transformer 27 are electrically connected to the rectifier and filter circuit 23. The rectifier and filter circuit 23 is further connected via the rectifier 231 to the resonant circuit 28 electrically. Thus, the resonant circuit 28 is electrically connected with the receiving-end coil 281.

The induction type power supply system in the above embodiment is capable of transmitting power and data synchronously by using the supplying-end coil 171 of the supplying-end module 1 and the receiving-end coil 281 of the receiving-end module 2, and can secure stable transmission of data signals regardless of the power to be transmitted. For transmission of high power between the supplying-end module I and receiving-end module 2, the power is reduced first to allow the data trigger signal to be transmitted successfully and then restored; during the period when no data signal is transmitted, the supplying-end module 1 will shut down the voltage comparator used to detect the trigger signal. i.e., deactivate the function of receiving data trigger signal, so that the noise interference resulting from load changes in the power transmission will not be processed and recognized by the supplying-end microprocessor 11.

Figure 13:
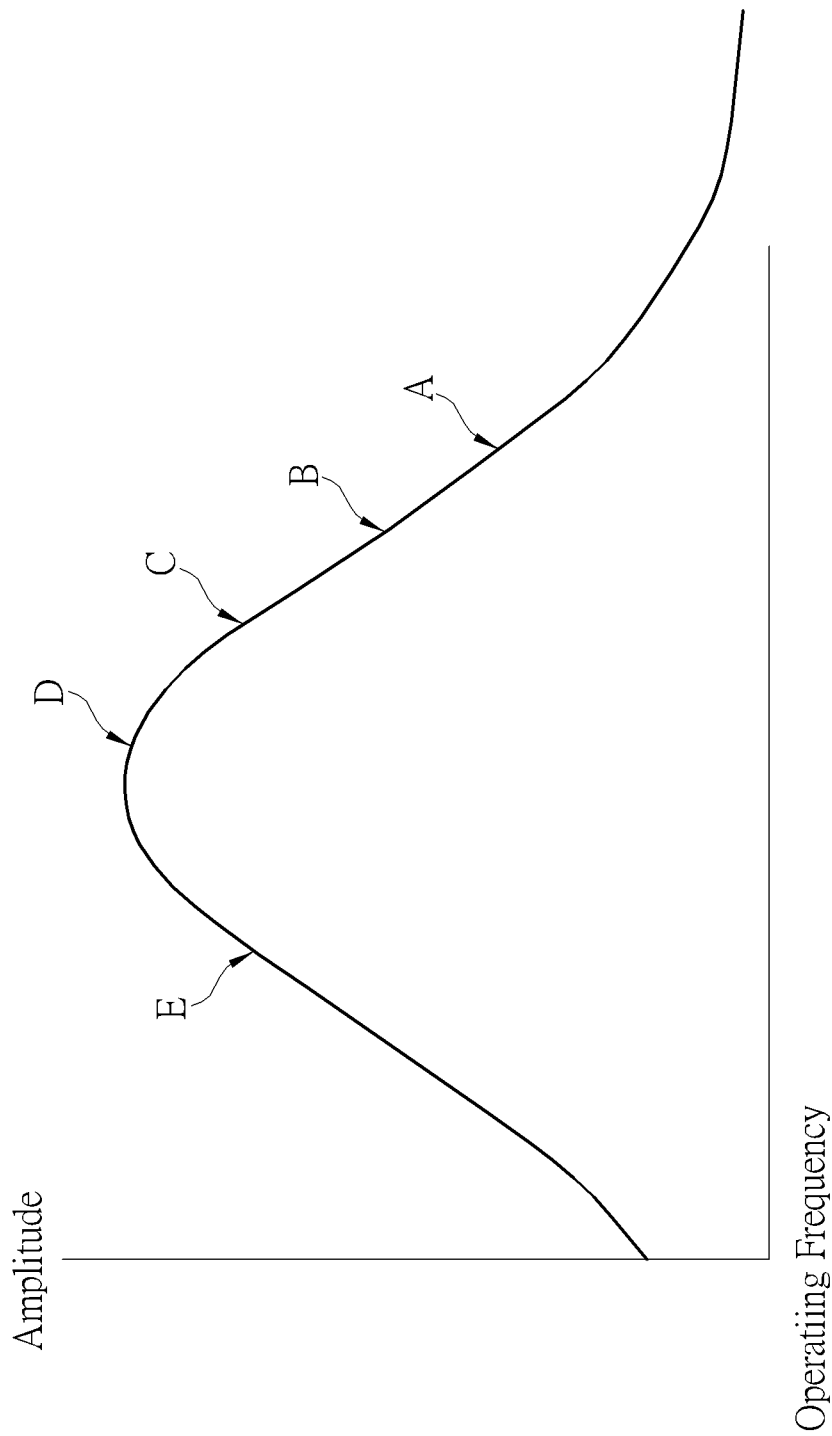
FIG. 13 is a chart illustrating waveform amplitude variation at data signal modulation point.
Figure 14A:
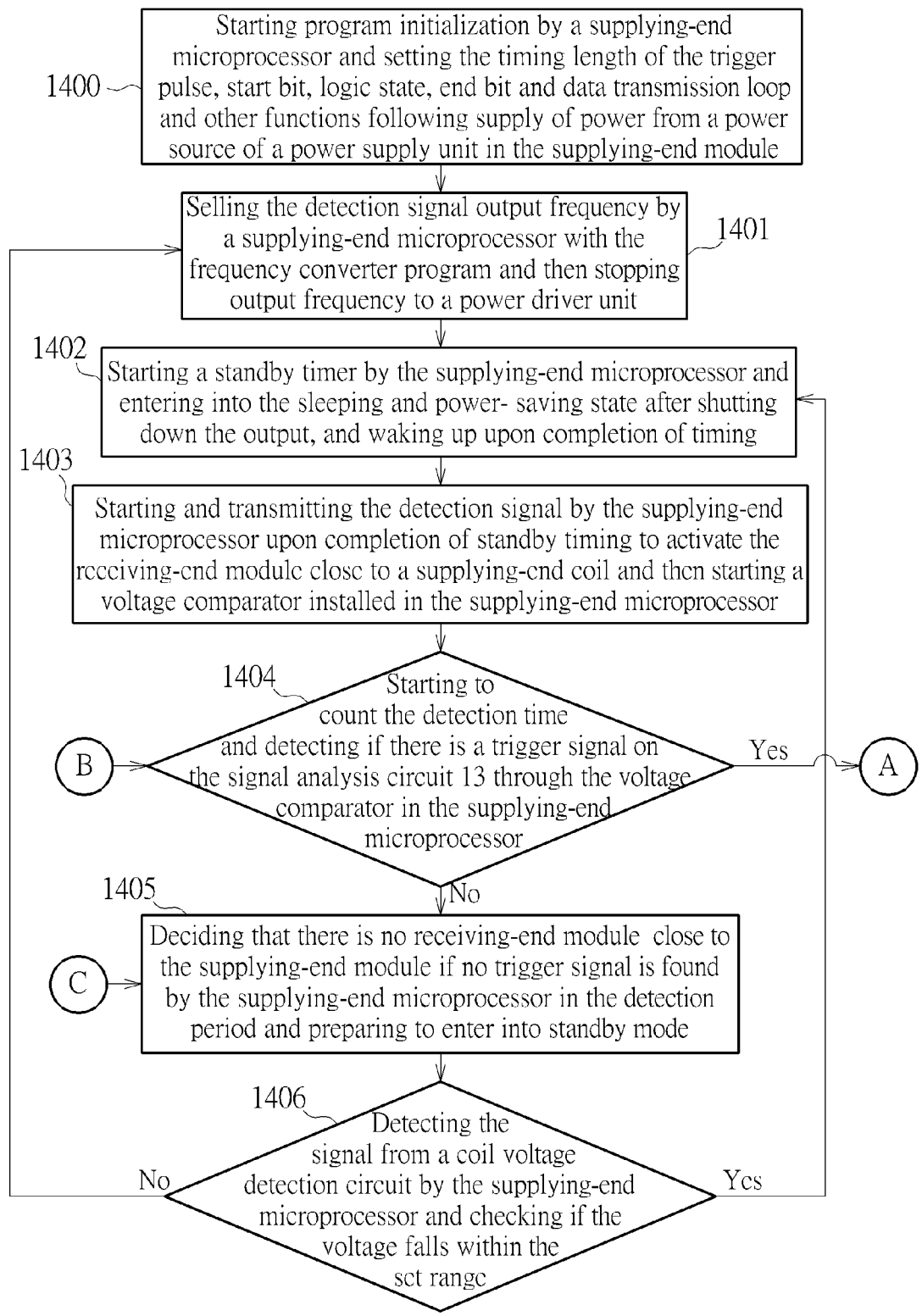
FIG. 14A and FIG. 14B are operation flow charts for supplying power in accordance with the present invention.
Figure 14B:
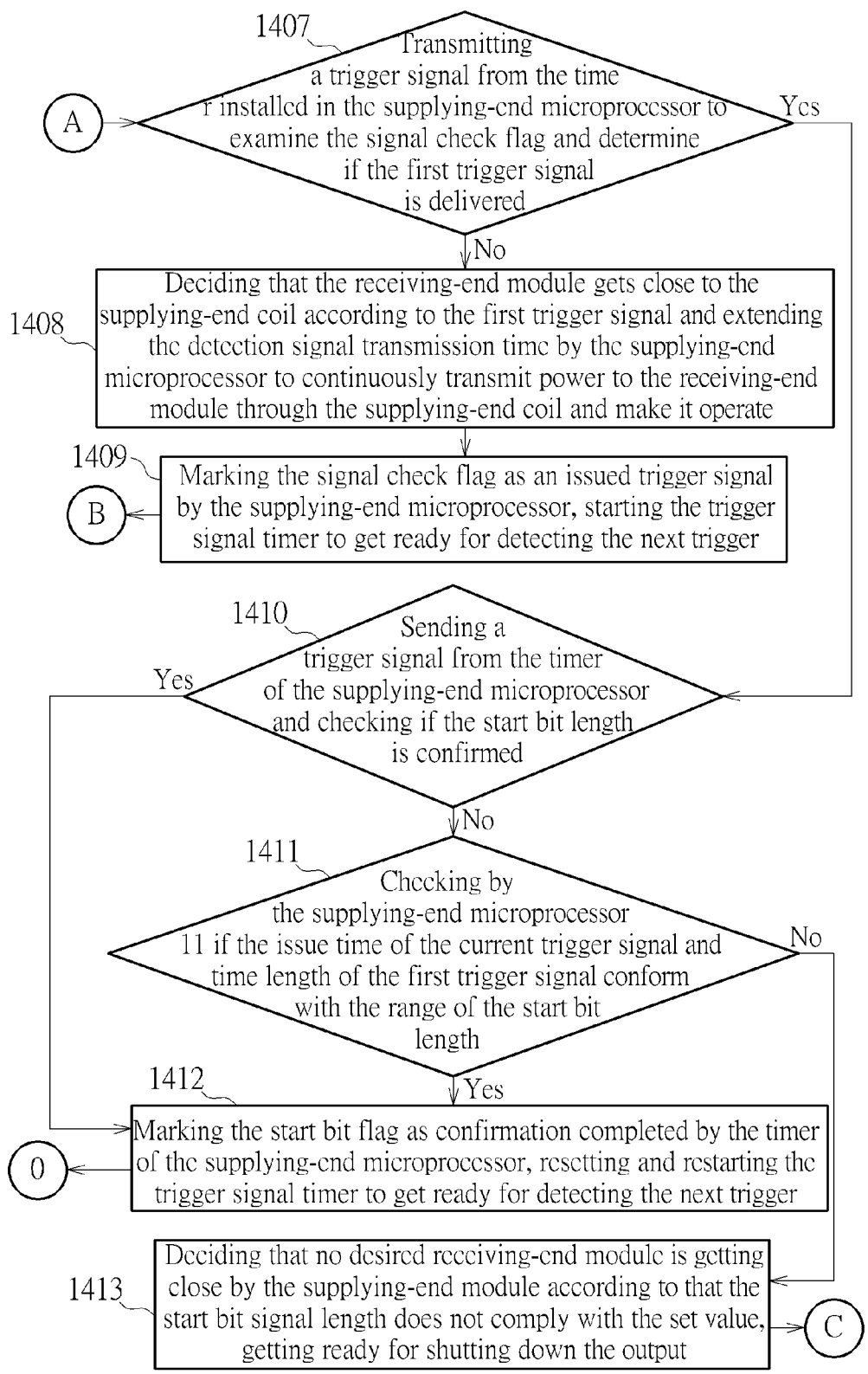
Figure 15:
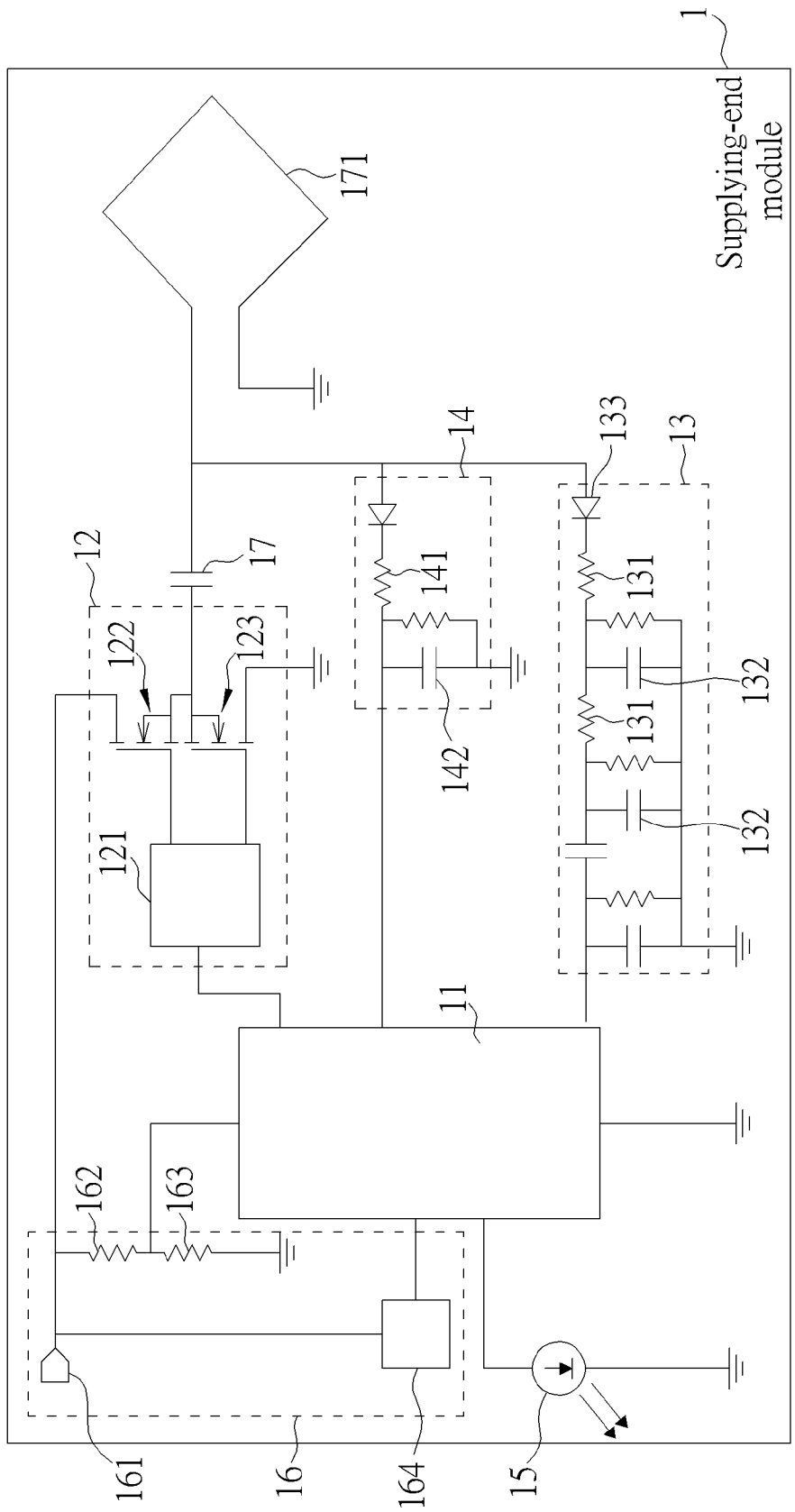
FIG. 15 is a schematic circuit diagram of the supplying-end module in accordance with the present invention.
Figure 16:
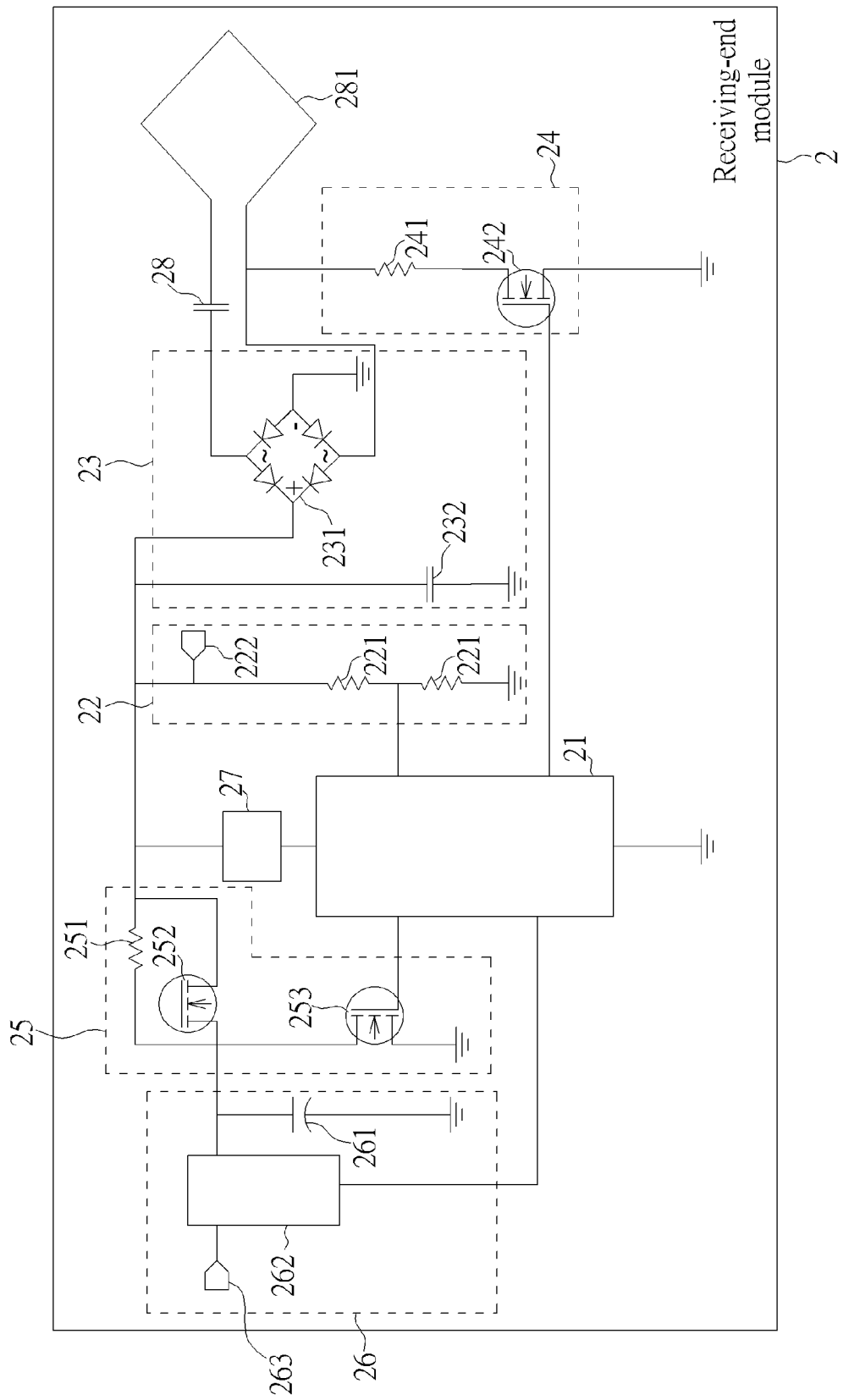
FIG. 16 is a schematic circuit diagram of the receiving-end module in accordance with the present invention.
Figure 17:
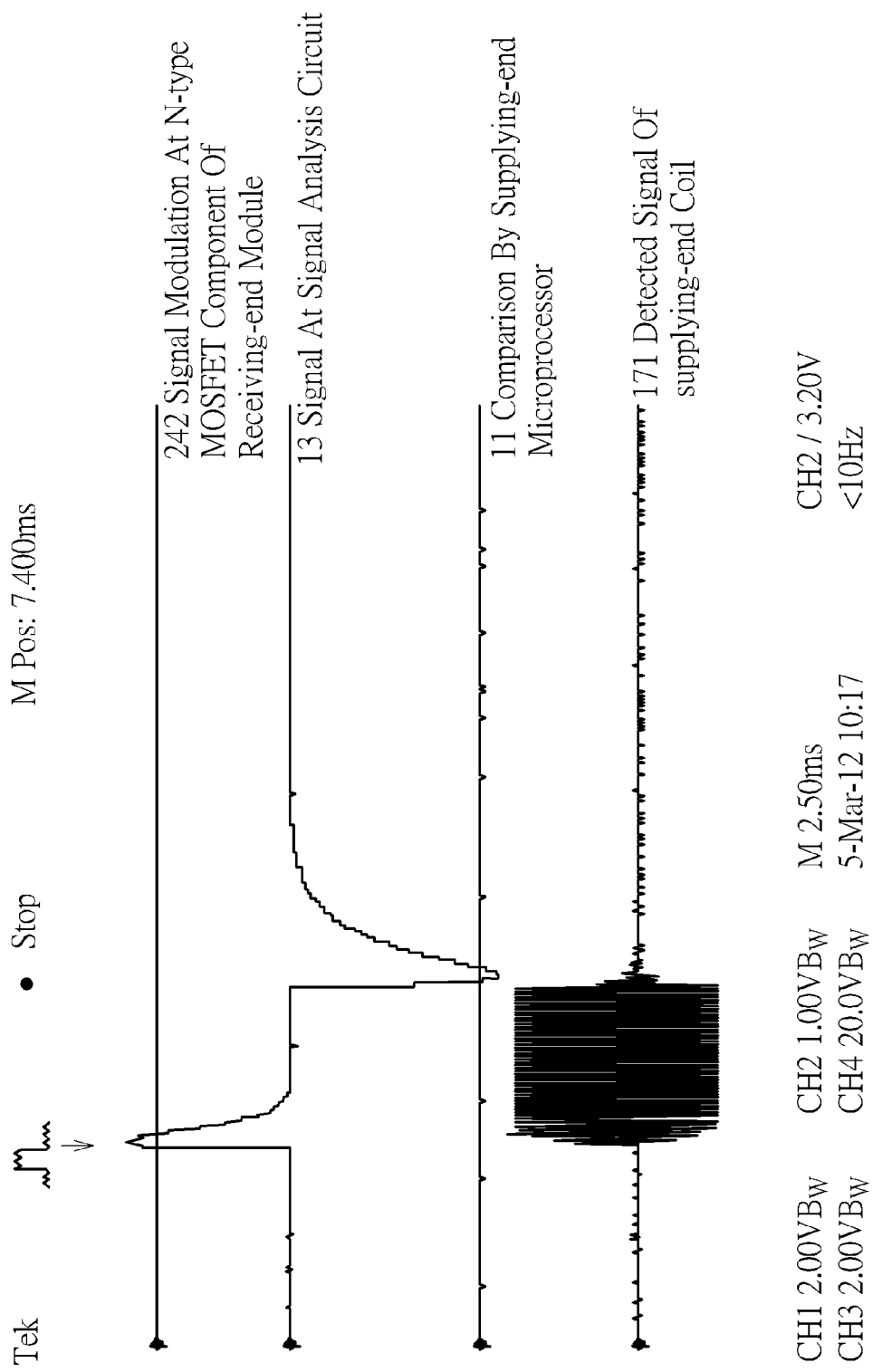
FIG. 17 illustrates a signal during detection of the supplying-end module in accordance with the present invention.
Figure 18:
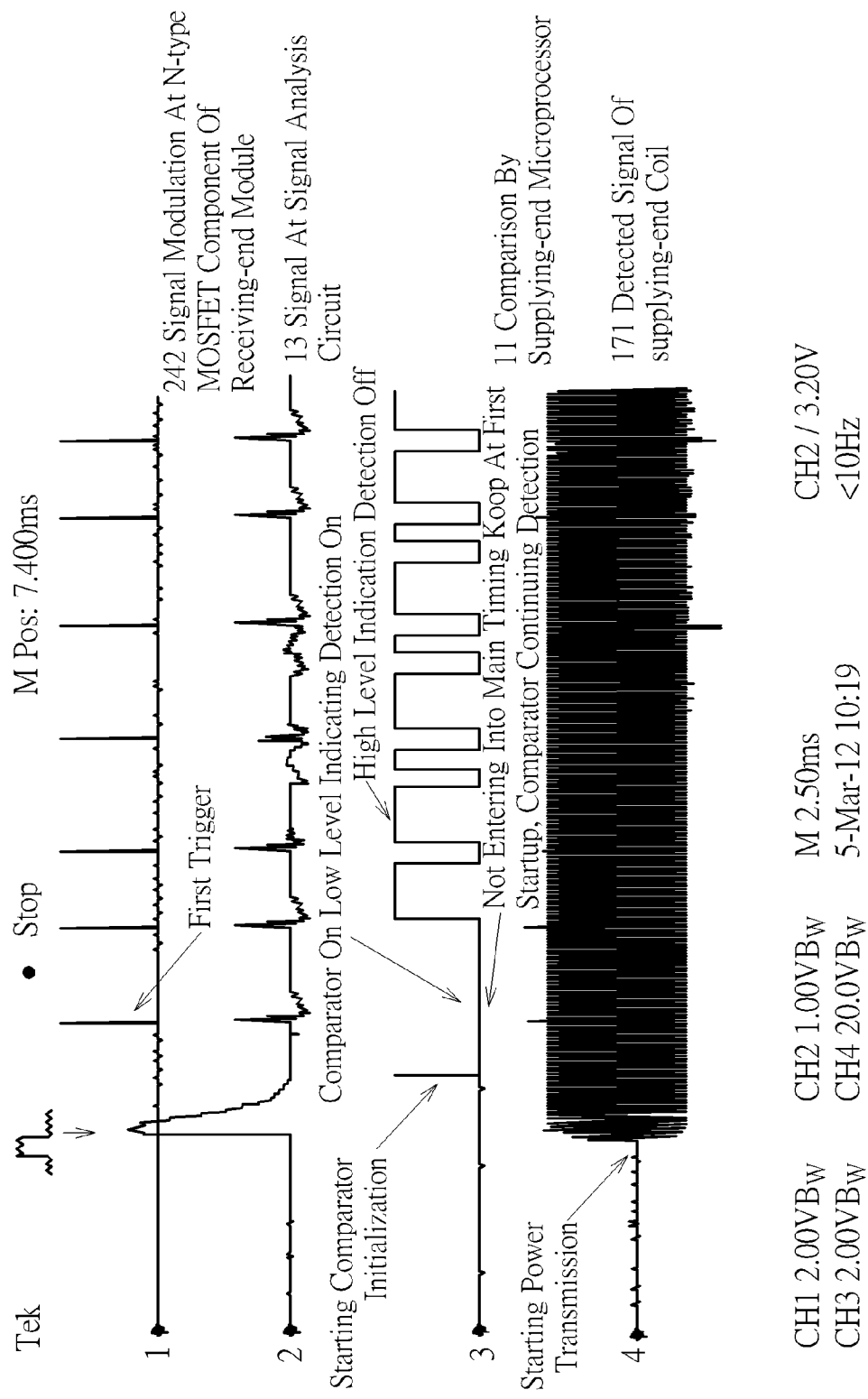
FIG. 18 illustrates a signal indicating extended power transmission after the supplying-end module detects the trigger signal from the receiving-end module in accordance with the present invention.
Figure 19:
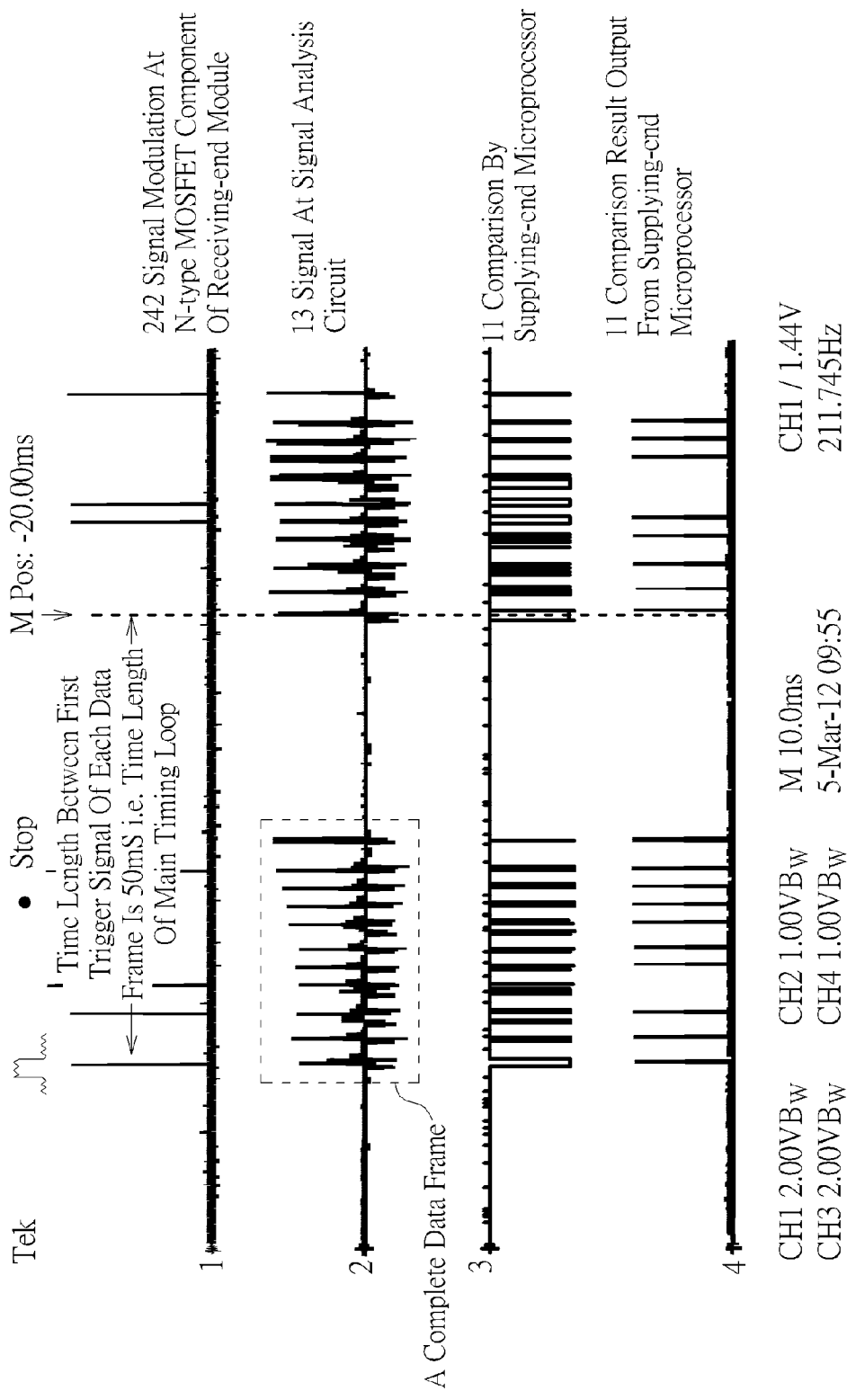
FIG. 19 illustrates a signal in a data frame (main loop gap) during power transmission in accordance with the present invention.
Figure 20:
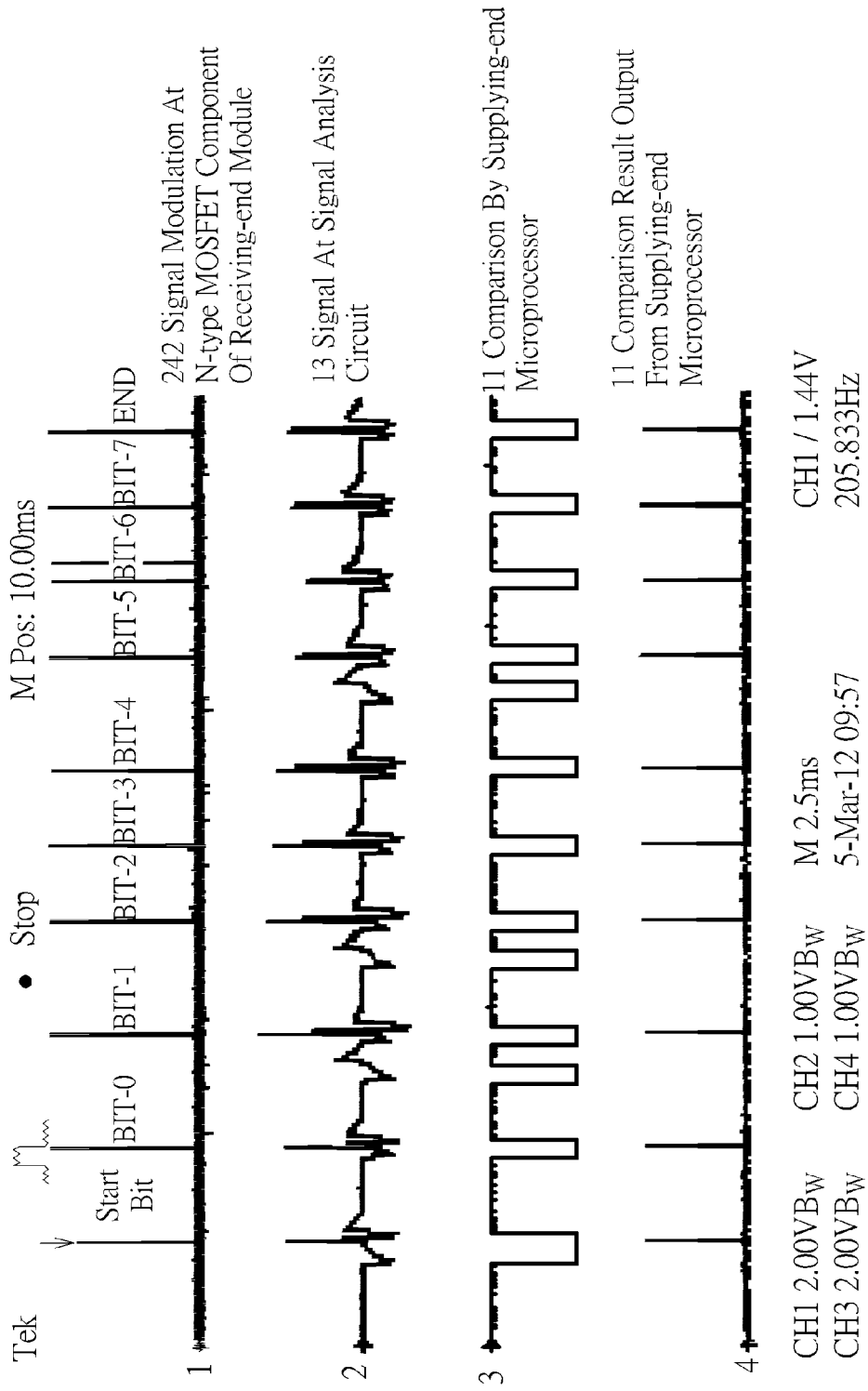
FIG. 20 illustrates a signal of data frame contents in accordance with the present invention.
Figure 21:
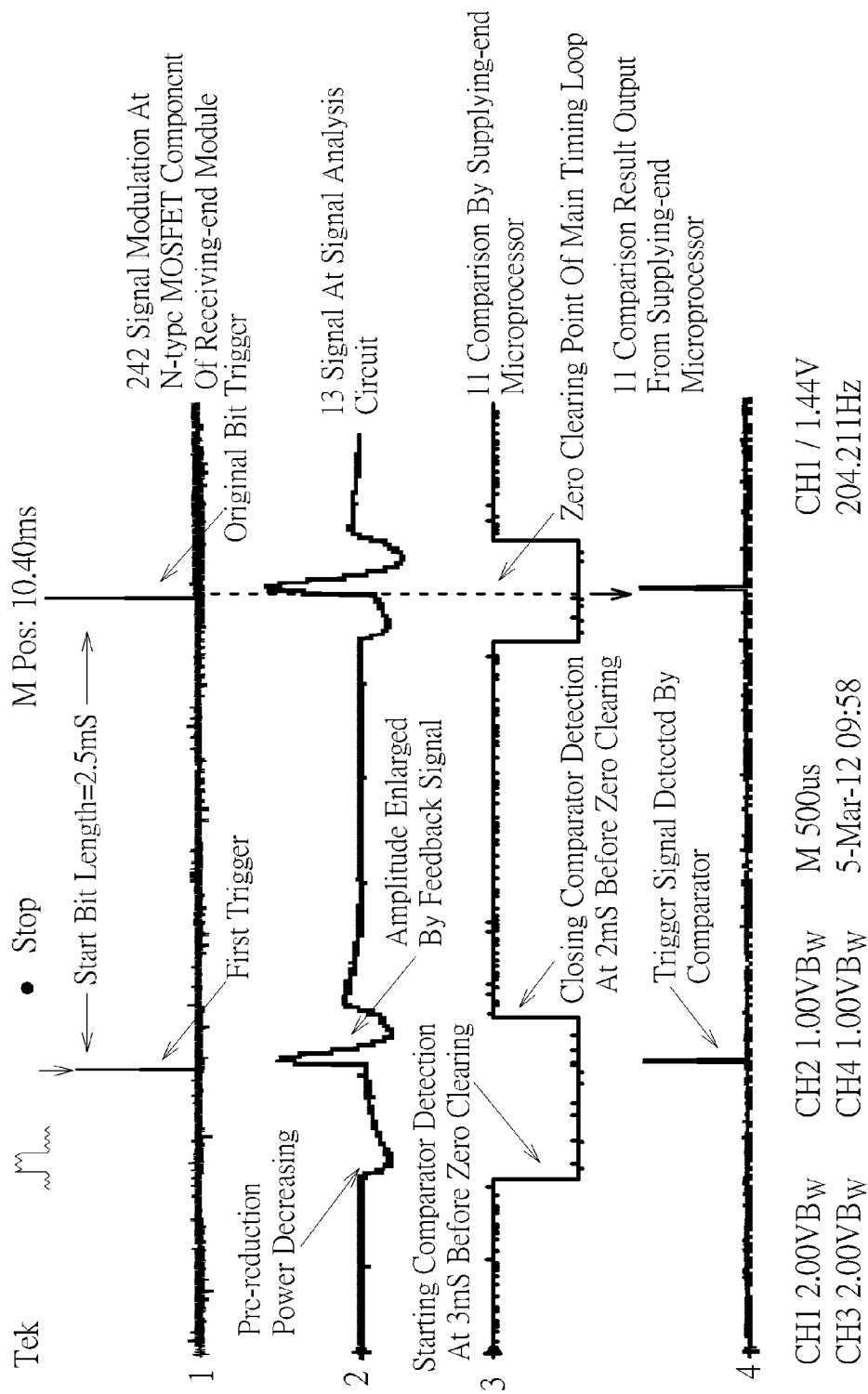
FIG. 21 illustrates a signal of the start bit length in a data frame in accordance with the present invention.
Figure 22:
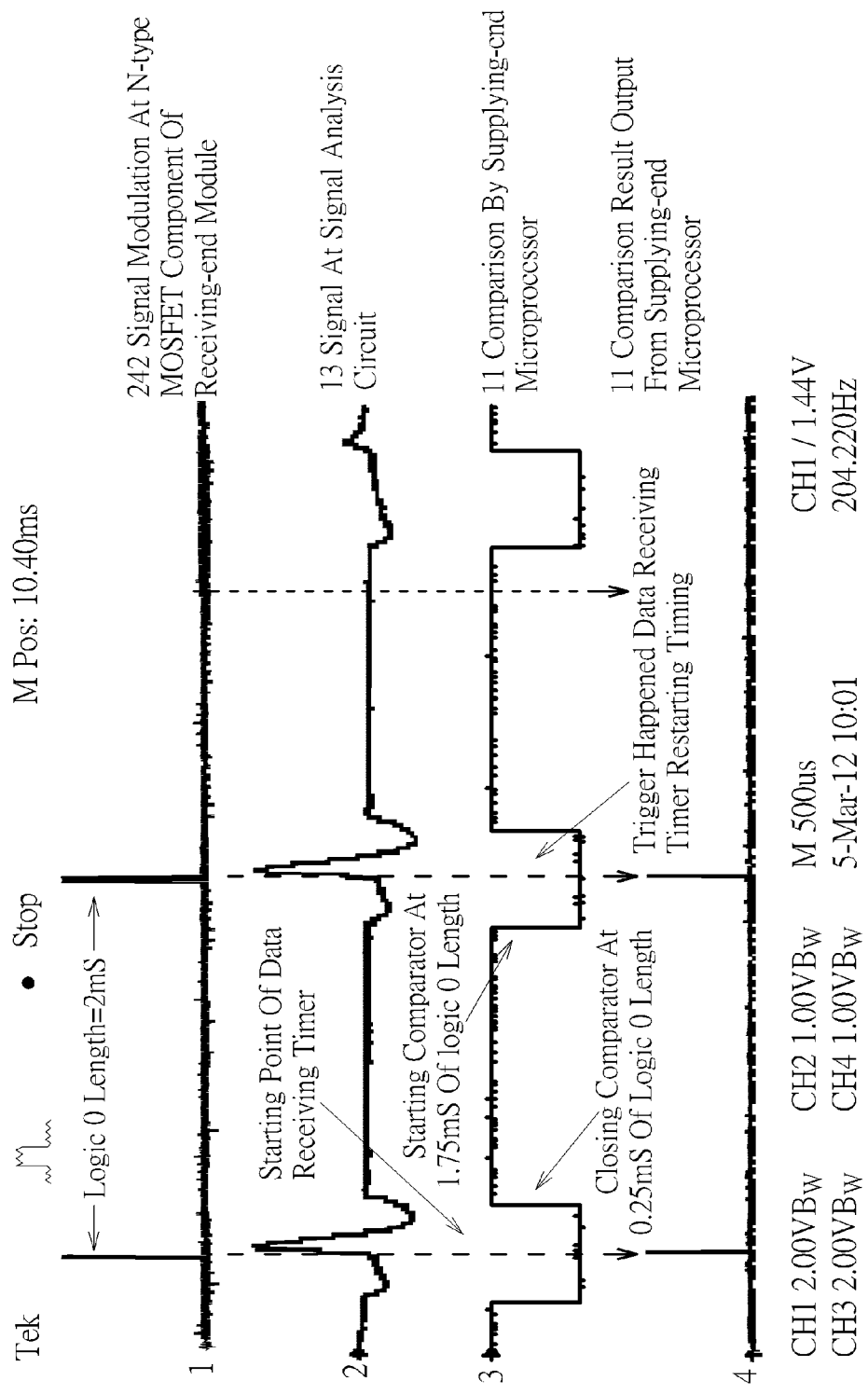
FIG. 22 illustrates a signal of logic 0 bit length in the data frame in accordance with the present invention.
Figure 23:
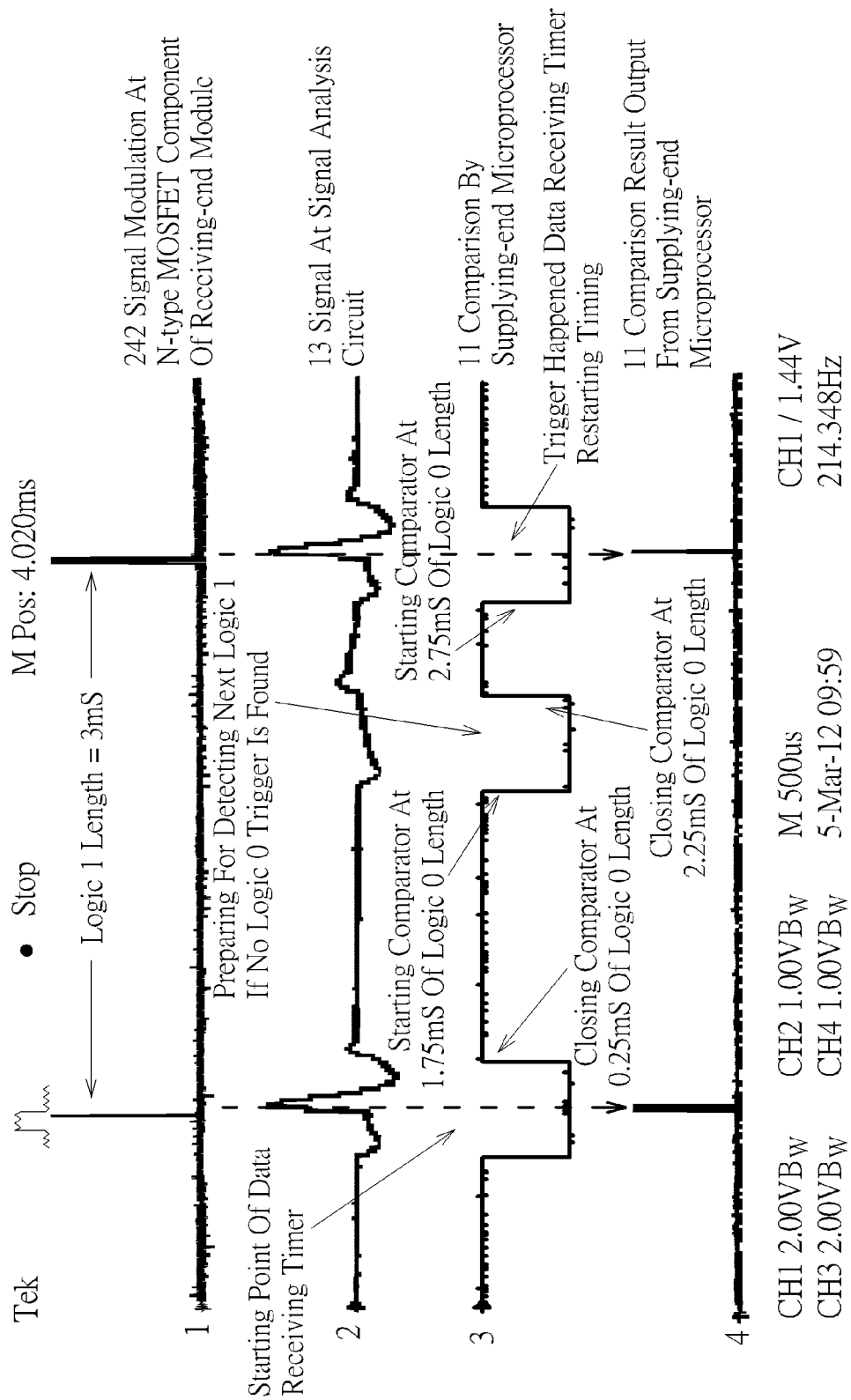
FIG. 23 illustrates a signal of logic 1 bit length in the data frame in accordance with the present invention.
Figure 24:
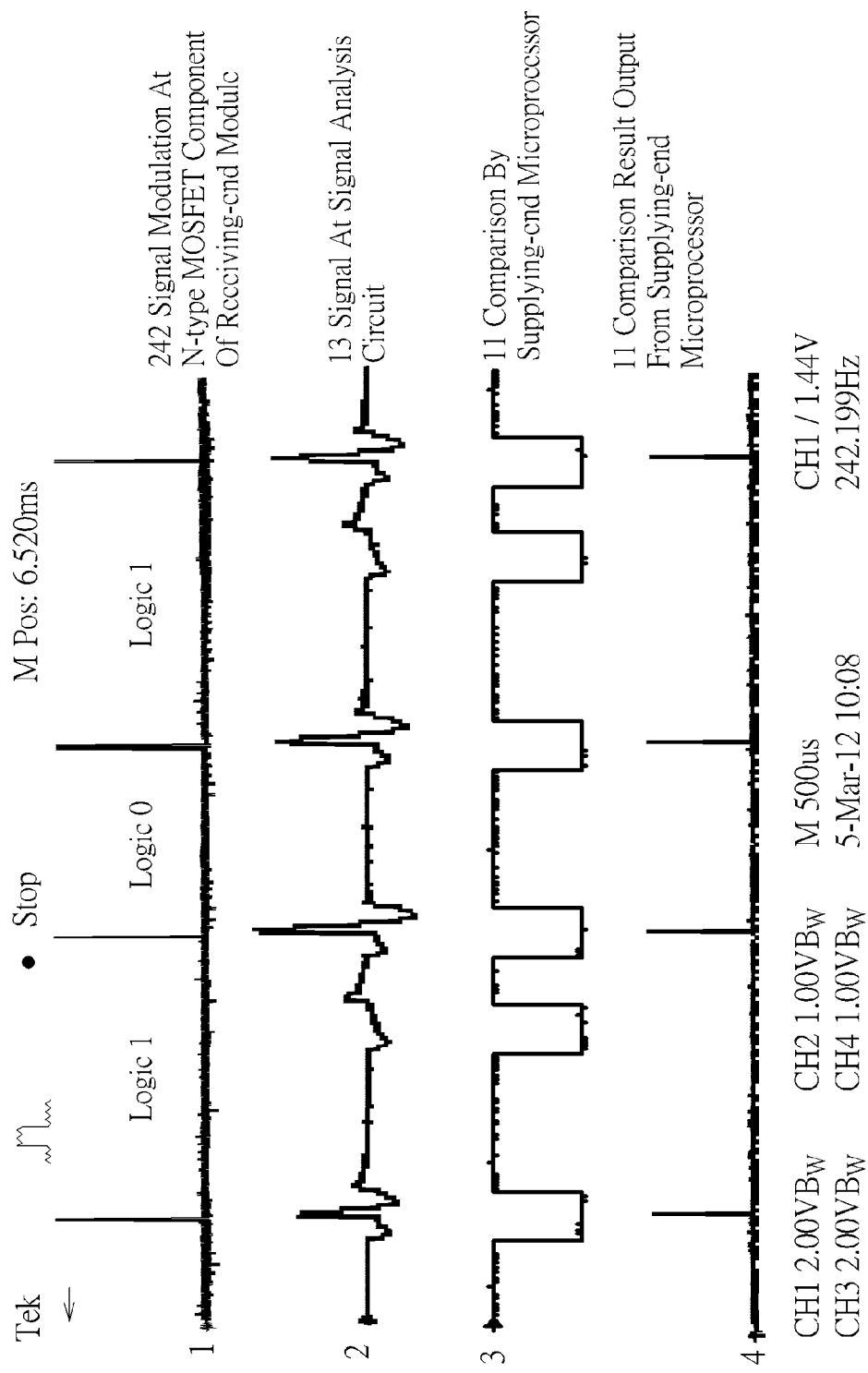
FIG. 24 illustrates a signal of transmission bit content in the data frame in accordance with the present invention.

However, the above function needs to be achieved through precise and careful arrangement between the supplying-end module I and receiving-end module 2, so that the supplying-end module 1 predicts the time to transmit data signals by the receiving-end module 2, starts the voltage comparator used for detecting the trigger signal in the supplying-end microprocessor 11 only during transmission of data trigger signals and will not perform other operations during data transmission, except for detecting the trigger signals from the receiving-end module 2. After the power for transmitting electric power is increased, the operating voltage wave amplitude is lowered from Point C (or point D. referring to FIG. 13) to Point B prior to data signal triggering, so that the modulated trigger signal wave amplitude will increase from Point B to Point C or D. The trigger signal processed in this way is still capable of increasing amplitude changes, thus solving the problem that the signal wave amplitude at Point P is lower than that at Point C or D following high power modulation, which may result in system error. Moreover, each time when data signals are transmitted, the supplying-end module 1 will also calibrate its timer against the synchronous time of tile receiving-end module 2 to secure correct timing in every process of data transmission, and the data signals are received by the supplying-end coil 171 correctly in the process when the receiving-end module 2 is transmitting trigger signals. For tile receiving-end microprocessor 21 of the receiving-end module 2, it is only necessary to transmit trigger pulses without the need to consider the length of data signals to be modulated, as it can shorten the time for data signal modulation to the largest degree, reduce the energy loss in the process of modulation, and reduce vibrations of the receiving-end coil 281 caused by current changes during transmission of data signals.

Figure 30:
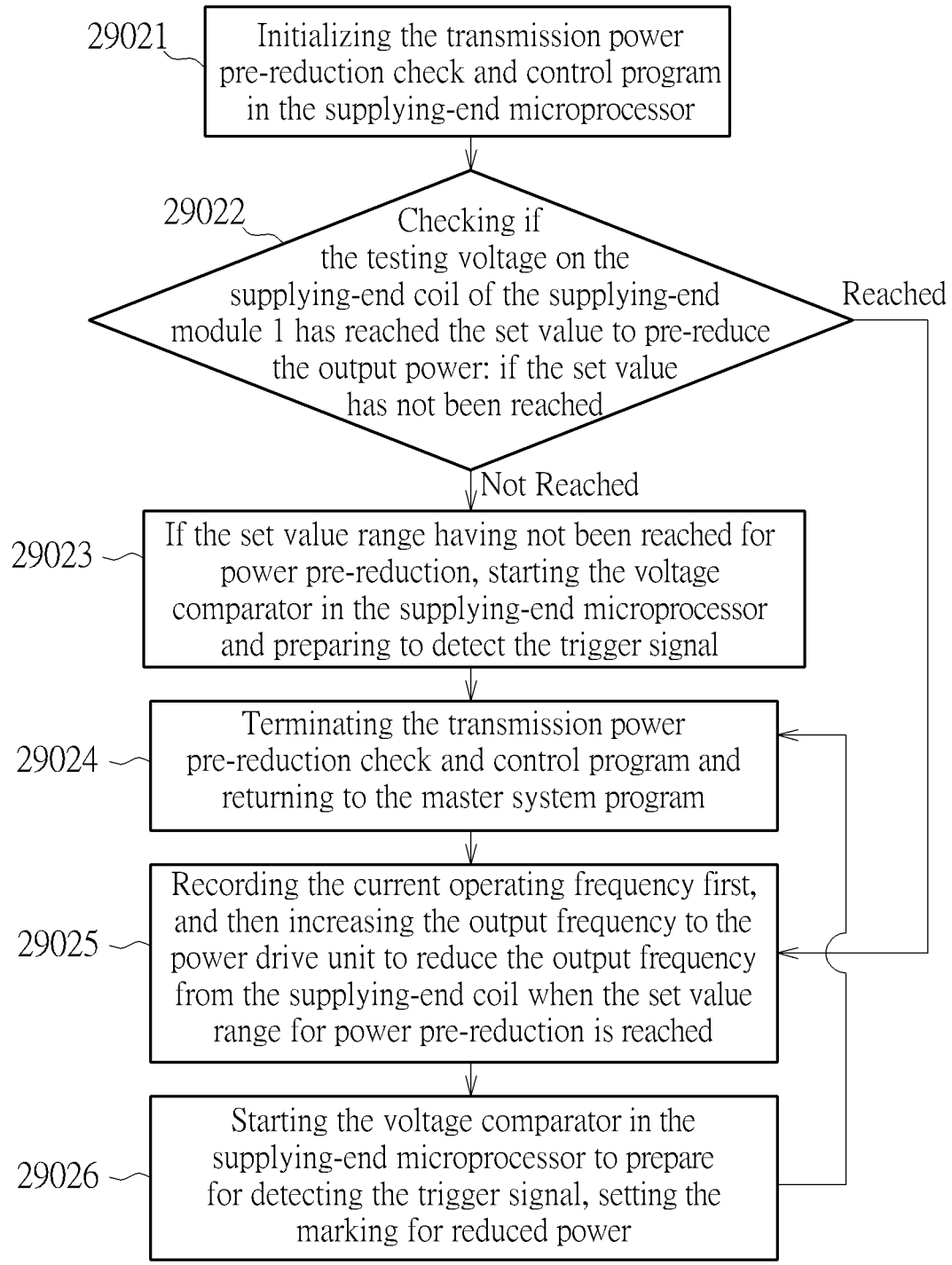
FIG. 30 is an operation flow chart of initialization of the transmission power pre-reduction check and control program before the transmission frequency is ready to reduce in accordance with the present invention.
Figure 31:
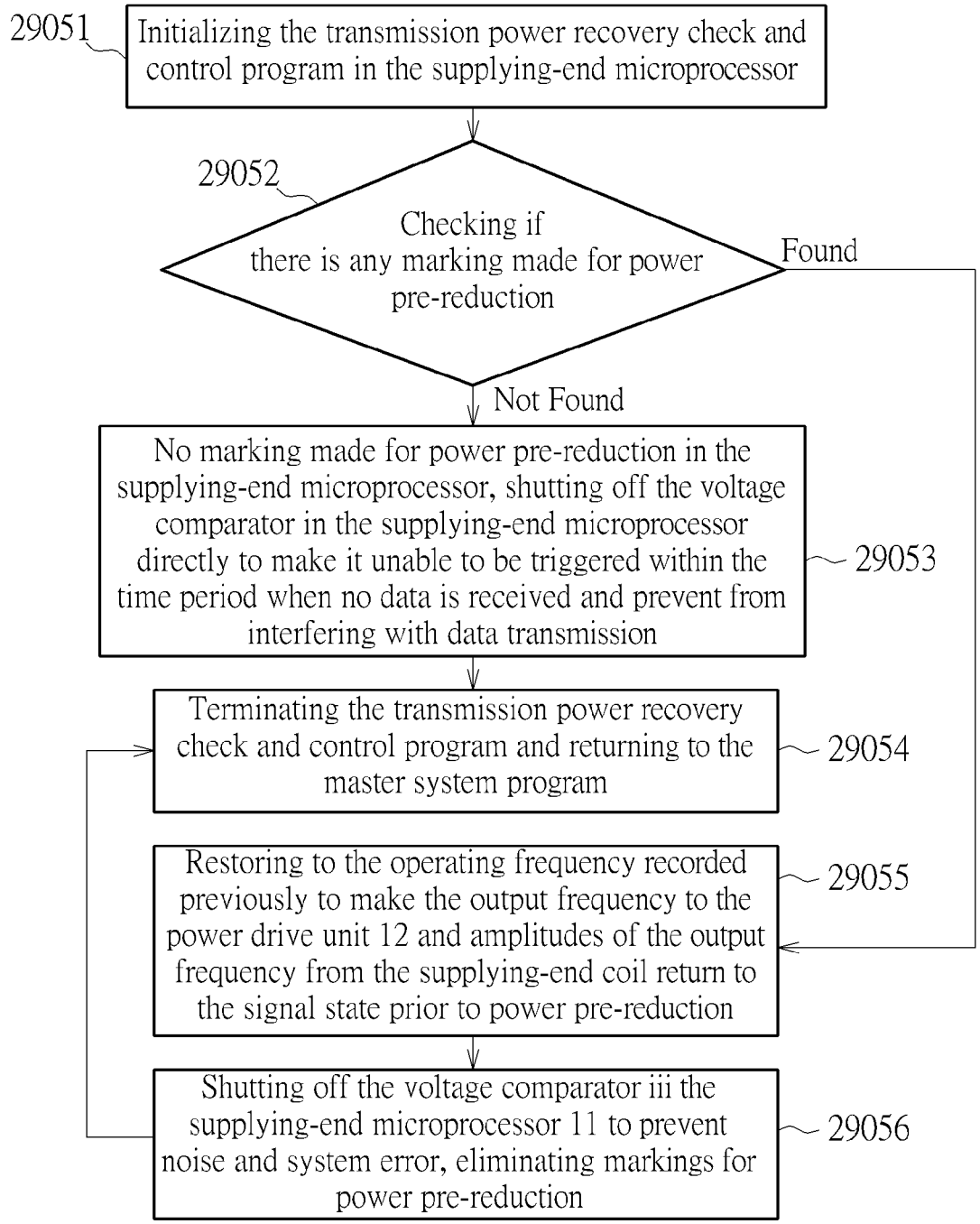
FIG. 31 is an operation flow chart of initialization of the transmission power recovery check and control program before the transmission frequency is ready to restore in accordance with the present invention.
Figure 32:
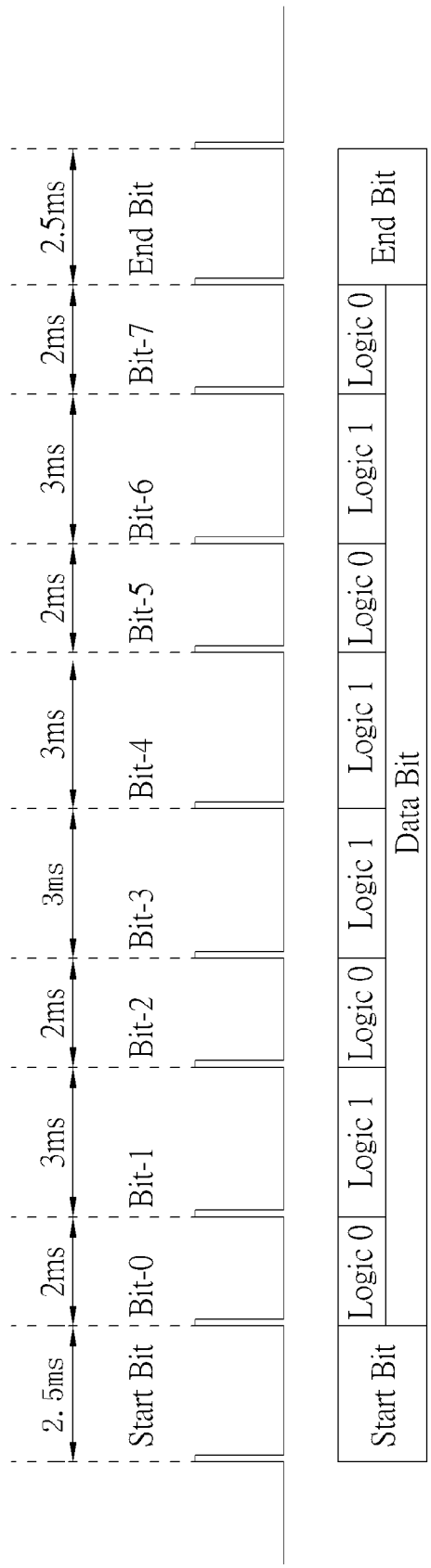
FIG. 32 is a schematic circuit diagram of the receiving-end module in accordance with the present invention.

Please jointly refer to FIGS. 29A-29E, 30 and 31. FIGS. 29A-29E are operation flow charts for synchronous power supply and data transmission in accordance with the present invention. FIG. 30 is an operation flow chart of initialization of the transmission power pre-reduction check and control program before the transmission frequency is ready to reduce in accordance with the present invention. FIG. 31 is an operation flow chart of initialization of the transmission power recovery check and control program before the transmission frequency is ready to restore in accordance with the present invention. As shown in FIGS. 29A-29E, 30, 31, the method for synchronous transmission of power and data signals in the induction type power supply system comprises the steps of:

Step 2900: Initializing a data signal receiving program in the supplying-end microprocessor 11 and setting values of main timing loop and data length ranges after power is supplied from the power source 161 of the supplying-end module 11.

Step 2901: The supplying-end microprocessor 11 starting and transmitting the main timing loop of data transmission, and performing programmed operations at the scheduled time.

Step 2902: The supplying-end microprocessor 11 transmitting the main timing loop, and performing initialization of a transmission power pre-reduction check and control program within 3 mS before the main timing loop of transmission is cleared to zero.

Step 2903: Checking the trigger signal that indicates the first trigger range of the start signal; if a trigger signal is found within 2.5 mS±0.5 mS prior to zero clearing of the timer for the main timing loop, proceeding to step 2904; otherwise, proceeding to step 2905.

Step 2904: Marking the signal check flag as a transmitted trigger signal starting the trigger signal timer to prepare for the next trigger and proceeding to step 2905.

Step 2905: The supplying-end microprocessor 11 transmitting the main timing loop, and performing initialization of a transmission power recovery check and control program within 2 mS prior to zero clearing of the timer for the main timing loop of transmission.

Step 2906: The supplying-end microprocessor 11 transmitting the main timing loop, and performing initialization of the transmission power pre-reduction check and control program within 0.5 mS prior to zero clearing of the timer for the main timing loop;

Step 2907: Checking the trigger signal that indicates the second trigger range of the start signal; if the bit length is found to be in inconformity with the set range within +0.5 mS prior to zero clearing of the timer for the main timing loop of transmission, proceeding to step 2908; if both triggers are completed and the length range is satisfied, proceeding to step 2911.

Step 2908: Recording a failed transmission if the supplying-end microprocessor 11 does not correctly receive two triggers whose bit length falls within the set range, shutting off the voltage comparator used for detecting the trigger signal, executing the transmission power recovery check and control program, and resetting the timing when the main timing loop returns to zero.

Step 2909: Deciding by the supplying-end microprocessor ii if the number of failed transmission is greater than the set upper limit value; proceeding to step 2910 if the upper limit value is reached; otherwise, proceeding to step 2901.

Step 2910: If the supplying-end microprocessor 11 does not receive any trigger signal within the expected time period, deciding that data transmission is failed, getting ready to terminate output from the supplying-end coil 171 and entering into the standby mode.

Step 2911: If the supplying-end microprocessor 11 receives two triggers of the start bit and finds out that the bit lengths fall within the set range. deciding that the start bit signal is fed from the receiving-end module 2 correctly clearing the timer for the main timing loop again and restarting it to synchronize the timer in the supplying-end microprocessor 11 with the timer for the main timing loop of data transmission in the receiving-end microprocessor 21.

Step 2912: Starting to receive data bits, and after the timer for receiving data bits is cleared to zero, restarting the supplying-end microprocessor 11.

Step 2913: Checking the signal flag that indicates completion of receiving to decide if a check is needed; proceeding to step 29131 if check is needed; otherwise, proceeding to step 2914.

Step 29131: Performing initialization of the transmission power pre-reduction check and control program when the timer for detection of data bit receiving runs for 2.25 mS in the supplying-end microprocessor 11.

Step 29132: Checking the trigger signal by the supplying-end microprocessor 11 and deciding that the data length of the end bit signal received is 2.5 mS+0.5 mS.

Step 29133: Executing the transmission power recovery check and control program when the timer for detection of data bit receiving runs for 2.75 mS in tile supplying-end microprocessor 11.

Step 29134: Data receiving completed by the supplying-end microprocessor 11 transferring the data into the supplying-end microprocessor 11 for internal use and preparing to receive data in the next data transmission loop, and then proceeding to step 2901.

Step 29135: Deciding that data transmission is failed if no triggering happened within the expected time period, executing the transmission power recovery check and control program, and proceeding to step 2908.

Step 2914: Performing initialization of the transmission power pre-reduction check and control program when the timer for detection of data bit receiving runs for 1.75 mS in the supplying-end microprocessor 11.

Step 2915: Checking the trigger signal by tile supplying-end microprocessor 11; if the triggering happened within 2 mS±0.5 mS. deciding that the data length of logic 0 signal received is 2 mS and proceeding to step 29151; if no triggering happened, proceeding to step 2916.

Step 29151: Clearing the timer for detection of data bit receiving to zero at the triggering point and restarting it, then marking the received data signal as logic 0.

Step 29152: Executing the transmission power recovery check and control program when the timer for detection of data bit receiving runs for 0.25 mS in the supplying-end microprocessor 11.

Step 29153: Storing the received logic bits into Rx data buffer cyclically in sequence from the most significant bit to the least significant bit, and adding one count to the data counter.

Step 29154: Checking if the number of data transmission has been equal to that of transmitted data bits; if yes, proceeding to step 29155; otherwise, proceeding to step 29156.

Step 29155: The supplying-end microprocessor 11 having received incomplete data bit, and preparing to receive the next trigger, and proceeding to step 2912.

Step 29156: The supplying-end microprocessor 11 having received a complete data bit, marking the end bit flag that needs to be checked, preparing to receive the next trigger and proceeding to step 2902.

Step 2916: Executing the transmission power recovery check and control program 29051 when the timer for detection of data bit receiving runs for 2.25 mS in the supplying-end microprocessor 11.

Step 2917: Executing the transmission power recovery check and control program (3021) when the timer for detection of data bit receiving runs for 2.75 mS in the supplying-end microprocessor 11.

Step 2918: Checking the trigger signal by the supplying-end microprocessor 11, deciding that the data length of the logic 1 bit signal received is 3 mS if the triggering happened within 3 mS±0.5 mS, and proceeding to step 2919; proceeding to step 29135 if the triggering does not happen.

Step 2919: Clearing the timer for detection of data bit receiving to zero and restarting the supplying-end microprocessor, and then marking the received data as logic 1.

Step 2920: Executing the transmission power recovery check and control program when the timer for detection of data bit receiving runs for 0.25 mS in the supplying-end microprocessor 11 and then proceeding to step 29152.

Moreover, initialization of transmission power pre-reduction check and control program in step 2902 comprises the steps of:

Step 29021: Initializing the transmission power pre-reduction check and control program in the supplying-end microprocessor 11.

Step 29022: Checking if the testing voltage on the supplying-end coil 171 of the supplying-end module 1 has reached the set value to pre-reduce the output power: if the set value has not been reached, proceeding to step 29023; otherwise, proceeding to step 29025.

Step 29023: If the set value range having not been reached for power pre-reduction, starting the voltage comparator in the supplying-end microprocessor 11 and preparing to detect the trigger signal.

Step 29024: Terminating the transmission power pre-reduction check and control program and returning to the master system program.

Step 29025: Recording the current operating frequency first, and then increasing the output frequency to the power drive unit 12 to reduce the output frequency from the supplying-end coil 171 when the set value range for power pre-reduction is reached.

Step 29026: Starting the voltage comparator in the supplying-end microprocessor 11 to prepare for detecting the trigger signal, setting the marking for reduced power and proceeding to step 29024.

Furthermore, initialization of the transmission power recovery check and control program in step 2905 comprises the steps of:

Step 29051: Initializing the transmission power recovery check and control program in the supplying-end microprocessor 11.

Step 29052: Checking if there is any marking made for power pre-reduction; if there is no marking, proceeding to step 29053; otherwise, proceeding to step 29055.

Step 29053: No marking made for power pre-reduction in the supplying-end microprocessor, shutting off the voltage comparator in the supplying-end microprocessor 11 directly to make it unable to be triggered within the time period when no data is received and prevent from interfering with data transmission.

Step 29054: Terminating the transmission power recovery check and control program and returning to the master system program.

Step 29055: Restoring to the operating frequency recorded previously to make the output frequency to the power drive unit 12 and amplitudes of the output frequency from the supplying-end coil 171 return to the signal state prior to power pre-reduction.

Step 29056: Shutting off the voltage comparator iii the supplying-end microprocessor 11 to prevent noise and system error, eliminating markings for power pre-reduction and proceeding to step 29054.

Referring to FIGS. 13, 15, 16, 32 and 33, when the receiving-end module 2 receives high-power electric energy, the N-type MOSFET component 242 of the amplitude modulation circuit 24 is turned on (high potential of the N-CH MOSFET 0 pin causes D-S conduction). Therefore, less time for high-potential conduction and trigger can result in less loss. In the present invention, the time for high-potential conduction and trigger (t) is 0.02 mS approximately (according to an example of the preferred embodiments of the present invention, and shall not be construed as limiting the time for conduction and trigger (t). which varies with actual design requirements), and a trigger signal is generated at each time of high-potential conduction (t) calculated at the edge of the trigger. In the receiving-end module 2, the calibrated interval between the first trigger signal (start bit) and the first trigger signal in the next data frame (start bit) is 50 mS (according to an example of the preferred embodiments of the present invention, shall not be construed as limiting the calibrated interval time which may vary with actual design requirements). As subsequent data frames may have different bit lengths (time) as a result of different contents of bytes (logic 0, bit-0 or logic 1, bit-1), the first trigger signal (start bit) is taken as the starting point for calculating time.

In an example of preferred embodiments of the present invention, both the start time and end time of data frames are 2.5 mS. Since data may comprise logic 0 (2 mS) or logic 1 (3 mS), the receiving-end microprocessor 21 of the receiving-end module 2 will begin to receive data signals only after confirming that the start bit length is 2.5 mS, and will receive an end bit signal of 2.5 mS again after having finished receiving the 1 triger signal (logic 0 and logic 1) for eight times. After the signals (8 triggers) between the start bit and end bit are received completely and flags of the start bit and end bit of 2.5 mS are transmitted successfully, these signals and flags can constitute correct data, thus reducing noise interference to analysis by the supplying-end module 1 in the process of data signal transmission and preventing data from being processed improperly (the above figures or descriptions are intended to illustrate an example of preferred embodiments of the present invention and shall not be construed as constraints over figures or descriptions of the present invention, and they may differ according to actual design requirements).

The timer is also required in the supplying-end microprocessor 11 of the supplying-end module 1 (the timing length may be set as 50 mS or designed in a different way) to predict the time needed for each transmission of data signals, and shall be synchronized with the timer in the receiving-end microprocessor 21 of the receiving-end module 2. If synchronization is implemented at the same time of triggering of the start bit, the timers of the supplying-end module I and receiving-end module 2 cannot be synchronized unless the start bit is interpreted correctly.

Figure 33:
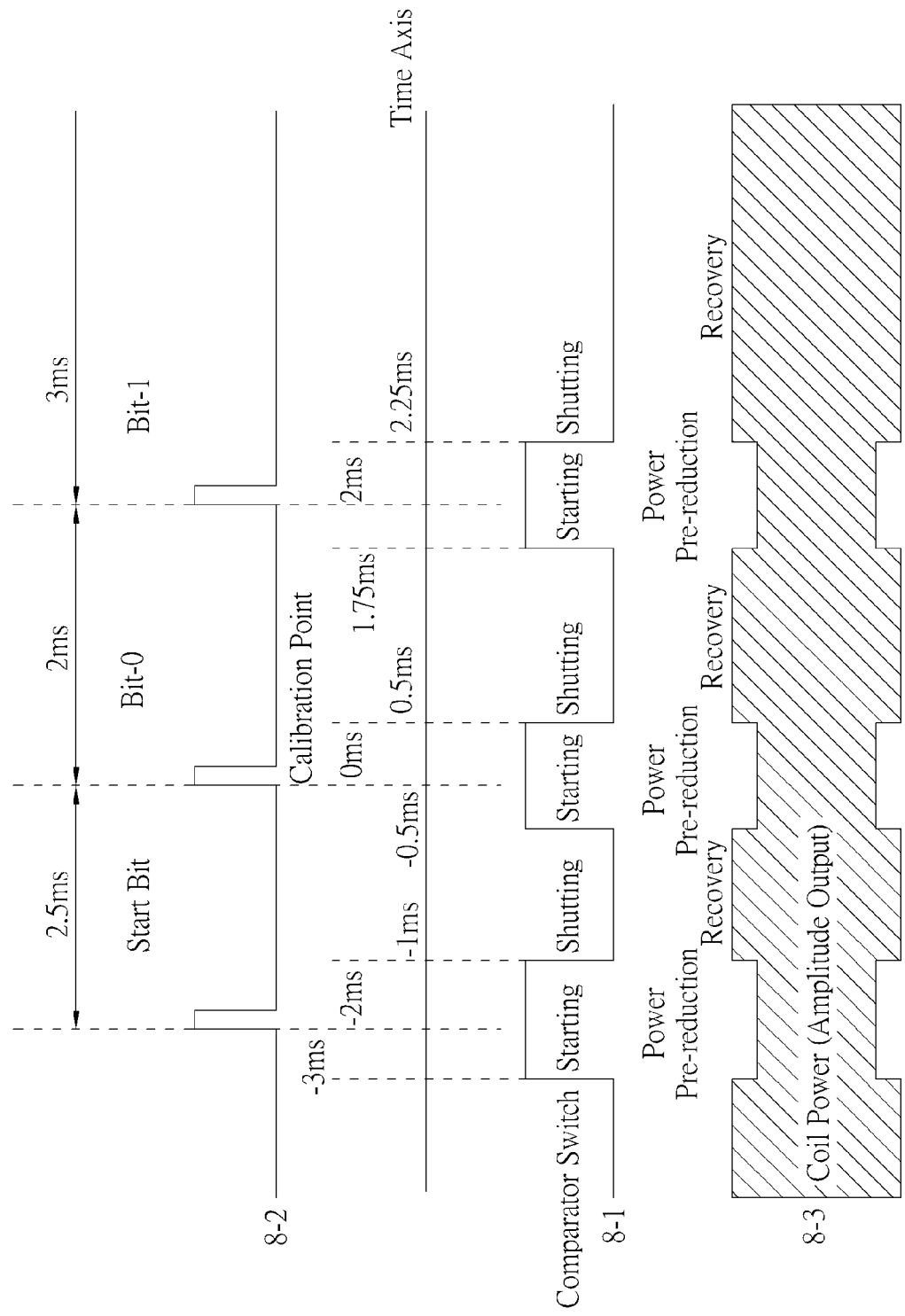
FIG. 33 is a chart illustrating waveform amplitude variation at data signal modulation point in accordance with the present invention.

After the timers of the supplying-end module 1 and receiving-end module 2 are synchronized, the supplying-end module 1 (refer to the No. 8-1 curve in FIG. 33) may start the comparator for detecting signals just before data is transmitted from the receiving-end module 2 (refer to the No. 8-2 curve in FIG. 33). Besides, the power output from the supplying-end module 1, if considerably high (refer to the No. 8-3 section in FIG. 33), may be reduced in advance to facilitate trigger signal transmission from the receiving-end module 2. However, the time of power reduction is very short (roughly 0.25 mS to 0.5 mS), and the section occurring on the receiving-end module 2 where transmission power reduces will be buffered by the buffer capacitor 261 of the voltage stabilizing circuit 26, thus preventing data signal output from the receiving-end module 2 from being affected.

It should be noted that the above descriptions are given to illustrate examples of preferred embodiments of the present invention and shall not be construed as limiting the appended patents claims of the present invention. In the present invention, the method of time-synchronized data transmission in induction type power supply system achieves transmission of power from the supplying-end microprocessor 11 of the supplying-end module 1 to the receiving-end coil 281 of the receiving-end module 2 and feedback of data signals from the receiving-end coil 281 to the supplying-end coil 171 of the supplying-end module 1 by using the timers embedded in the supplying-end microprocessor ii and receiving-end microprocessor 21 to synchronize timing and receiving trigger signals, thus enabling data signals to be stably transmitted synchronously while the supplying-end module 1 transmits power. So it can achieve the purpose of reducing transmission loss of data signals without affecting power transmission between the supplying-end module 1 and the receiving-end module 2. In one embodiment, the supplying-end microprocessor 11 of the supplying-end module 1 reduces the power to facilitate data transmission during high power transmission and restores the original power following data signal transmission, with the advantage of increasing the maximum transmission power of induction type power supply systems. Thus, the present invention can also achieve the utility function to synchronize charging and stable transmission of data signals. It is hereby stated that processes, embodiments, devices or configurations, etc that can achieve said effect shall be covered by the present invention, and that all modifications and equivalent structural changes shall be included in the appended patent claims of the present invention.

In practical applications, the method of time-synchronized data transmission in induction type power supply system has the advantages as follows:

(1) Both the supplying-end microprocessor 11 and the receiving-end microprocessor 21 includes a timer used to synchronize timing and predict the time for triggering data signals, so as to achieve high-power transmission of electric energy and stable transmission of data signals;

(2) The supplying-end microprocessor 11 can coordinate with the trigger time of the receiving-end microprocessor 21 to reduce high-power electric energy in advance during data transmission and restore the original power following completion of data transmission, without affecting transmission of electric power and data due to power reduction and increase in short period of time.

Therefore, the present invention relates to the method of time-synchronized data transmission in induction type power supply system. It uses the timers installed in the supplying-end microprocessor of the supplying-end module and receiving-end microprocessor of the supplying-end module for synchronization when data signals are fed from the receiving-end module to the supplying-end module, thus achieving stable and synchronous transmission of power and data signals between the receiving-end module and supplying-end module and stabilizing system operation for power transmission.

Figure 34A:
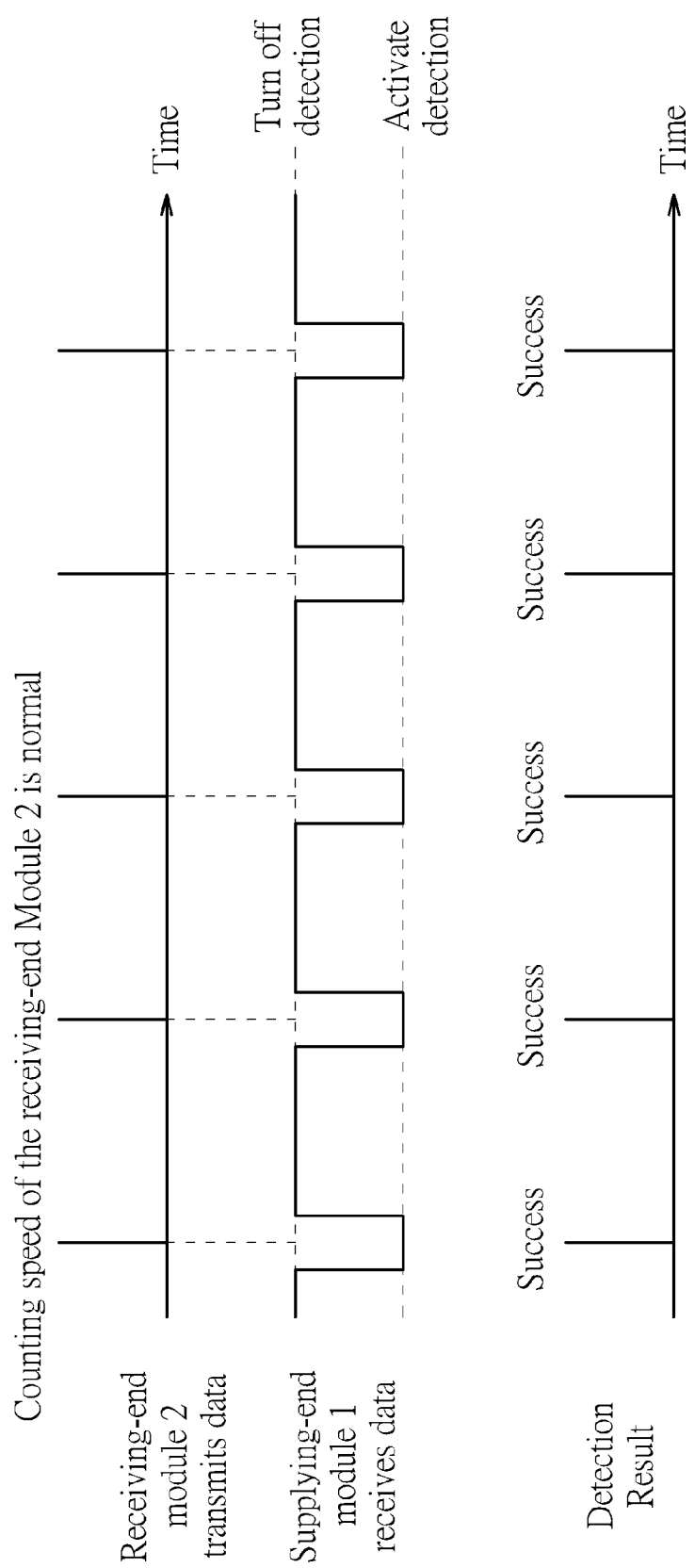
FIGS. 34A-34C are schematic diagrams of related signals when the induction type power supply system operates.
Figure 34B:
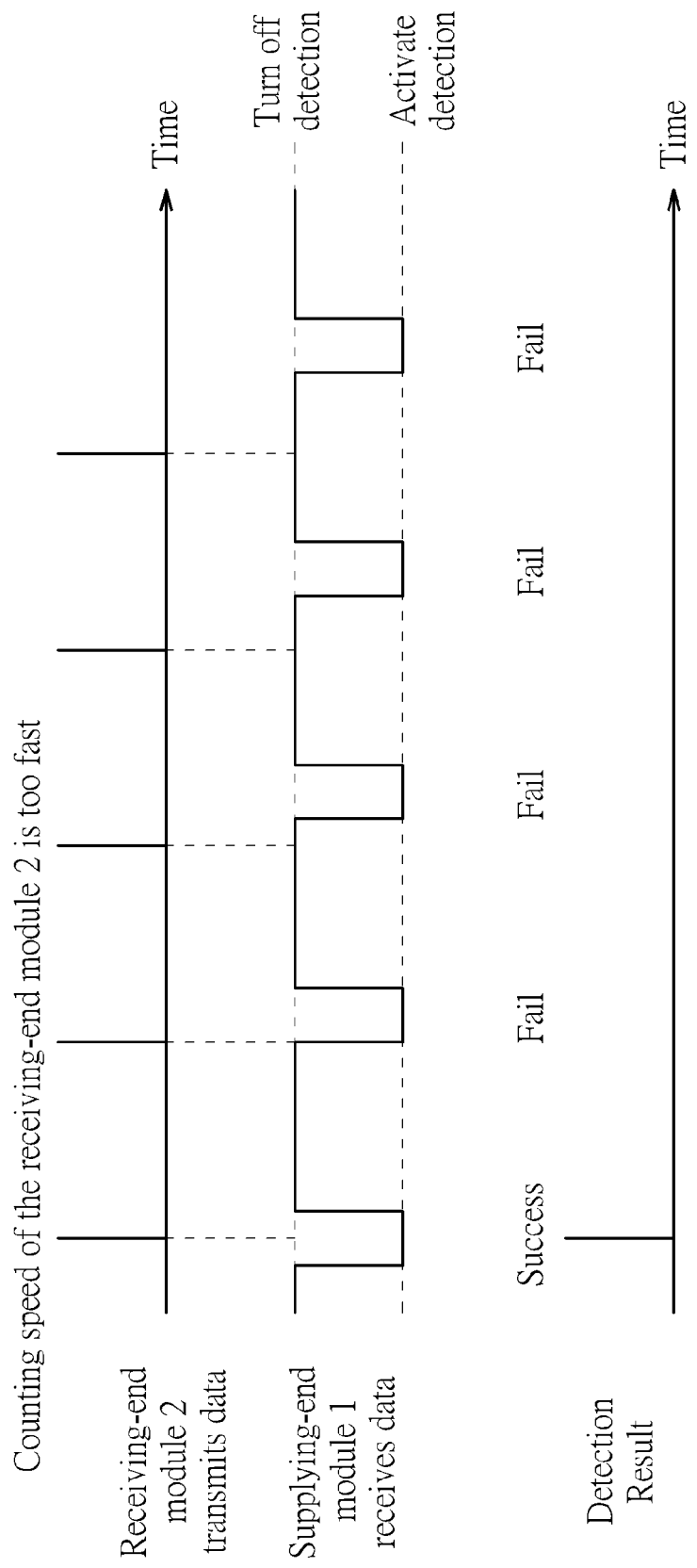
Figure 34C:
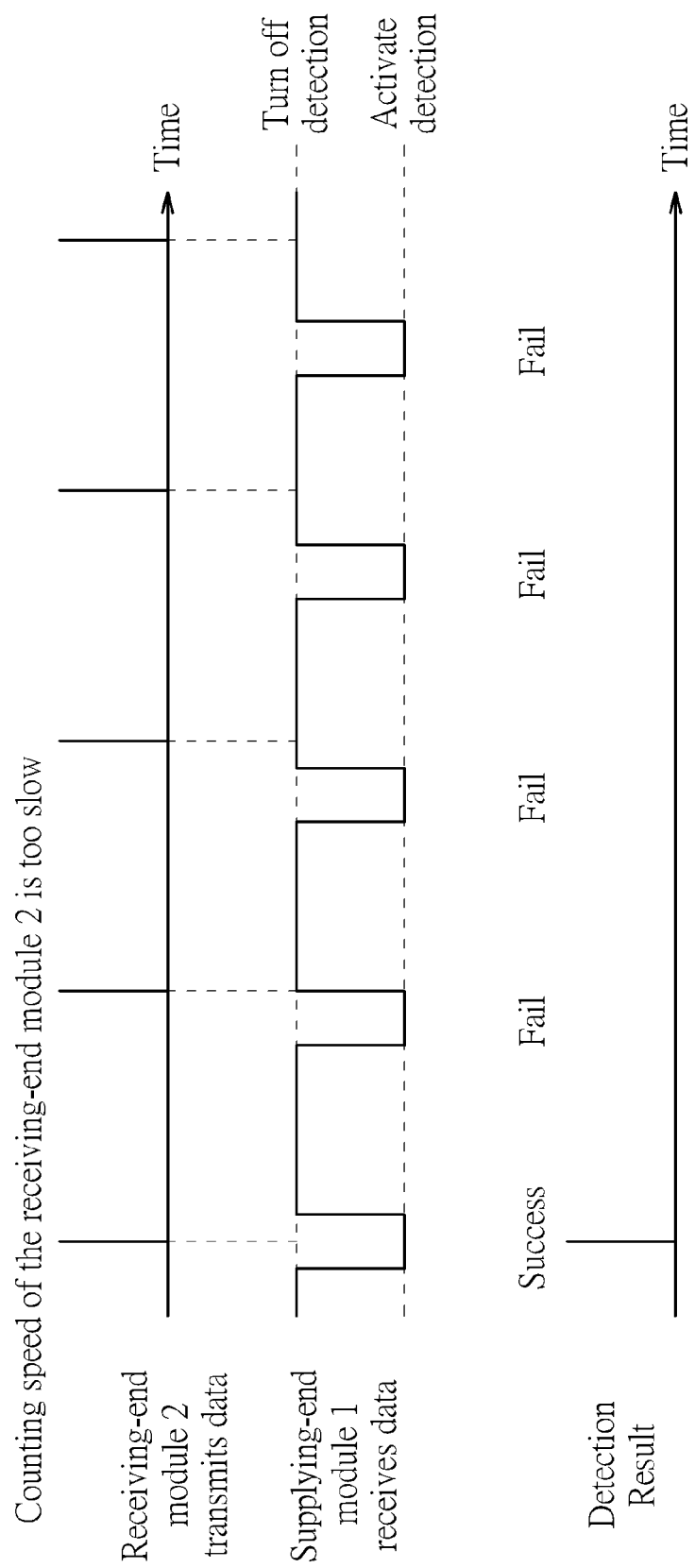

On the other hand, temperatures of electronic components of the receiving end module 2 vary with the operation of the induction type power supply system due to features of the hardware, resulting in the clock of the oscillator in the receiving-end microprocessor 21 changes. As a result, there will be a difference between the time counted by the timer configured in the supplying-end microprocessor 11 and that counted by the timer configured in the receiving-end microprocessor 21 and the supplying end module 1 may erroneously detect data signals. Please refer to FIGS. 34A-34C, FIGS. 34A-34C are schematic diagrams of related signals when the induction type power supply system operates. In FIG. 34A, the frequency of the clock in the supplying-end microprocessor 11 and that of the clock in the receiving-end microprocessor 21 are the same. The supplying-end module 1 receives the data impulses transmitted by the receiving-end module 2, normally. In FIG. 34B, since the frequency of the clock in the supplying-end microprocessor 11 is slower than that of the clock in the receiving-end microprocessor 21, the time counted by the timer configured in the supplying-end microprocessor 11 is longer than that counted by the timer configured in the supplying-end microprocessor 21. For the supplying-end module 1, the receiving-end module 2 transmits the data impulses early and the supplying-end module 1 cannot acquire the data impulses transmitted by the receiving-end module 2 accurately. Similarly, in the FIG. 34C, since the frequency of the clock in the supplying-end microprocessor 11 is faster than that of the clock in the receiving-end microprocessor 21, the time counted by the timer configured in the supplying-end microprocessor 11 is shorter than that counted by the timer configured in the supplying-end microprocessor 21. For the supplying-end module 1, the receiving-end module 2 delays the data impulses and the supplying-end module 1 cannot acquire the data impulses transmitted by the receiving-end module 2 accurately. In order to solve the above problem, the supplying-end module 1 in the induction type power supply system of the present invention can adjust the clock of the supplying-end microprocessor in the supplying-end module 1 according to periods between the data impulses corresponding to the start bit in contiguous data frames, for synchronizing the counting speed of the timer in the supplying-end microprocessor 11 of the supplying-end module 1 and that of the timer in the receiving-end microprocessor of the receiving-end module 2.

Figure 35:
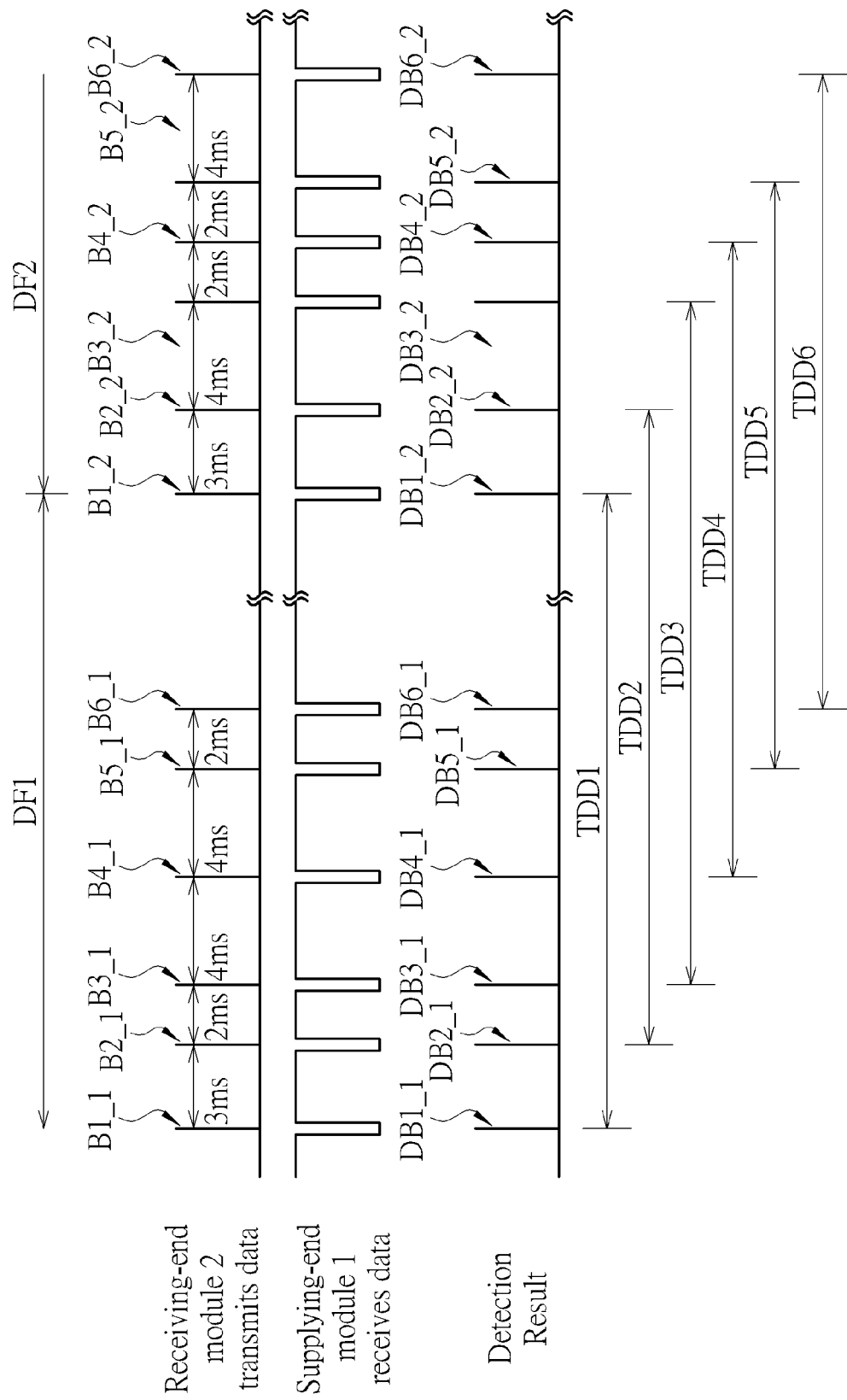
FIG. 35 is a schematic diagram of related signals when the induction type power supply system of the present invention operates.

For example, please refer to FIG. 35, which is a schematic diagram of related signals when the induction type power supply system of the present invention operates. As shown in FIG. 35, the receiving-end module 2 transmits data frames DF1, DF2 to the supplying-end module 1 and the supplying-end module 1 turns on a receiving function at corresponding times for detecting data impulses B1_1-B1_6, B2_1-B2_6 in the data frames DF1, DF2 as the data impulses DB1_1-DB1_6, DB2_1-DB2_6. Since the period between the data frame DF1 and the data frame DF2 is fixed to a data frame threshold TI_1 (e.g. 50 mS) according to a predetermined values in the system, the supplying-end module 1 can calculate a period between the data impulse DB1_1 and the data impulse DB2_1 as a data frame period TDD_1 and adjust the clock in the supplying-end microprocessor 11 of the supplying-end module 1 via comparing the data frame period TDD_1 and the data frame threshold TI_1. Accordingly, the counting speed of the timer using the clock of the supplying-end microprocessor 11 in the supplying-end module 1 can be adjusted appropriately. In this embodiment, the supplying-end module 1 slows the clock of the supplying-end microprocessor 11 when the data frame period TDD_1 is greater than the data frame threshold TI_1, for slowing the counting speed of the timer using the clock of the supplying-end microprocessor 11 in the supplying-end module 1; otherwise, the supplying-end module 1 speeds up the clock of the supplying-end microprocessor 11 when the data frame period TDD_1 is smaller than the data frame threshold TI_1, for speeding up the counting speed of the timer using the clock of the supplying-end microprocessor 11 in the supplying-end module 1. That is, the supplying-end module 1 determines the difference between the counting speed of the timer in the supplying-end module 1 and that of the timer in the receiving-end module 2 via comparing the data frame period TDD_1 and the data frame threshold TI_1. The supplying-end module 1 then adjusts the clock of the supplying-end microprocessor 11 accordingly, for adjusting the counting speed of the timer using the clock of the supplying-end processor 11 in the supplying-end module 1. As a result, the data transmission between the supplying-end module 1 and the receiving-end module 2 works normally.

Please note that, the receiving-end module 2 transmits corresponding data impulses B1_1-B1_6, B2_1-B2_6 of the data frames DF1, DF2 with periods predetermined in the system (i.e. the period of each bit in the data frame). For example, both the period between the data impulse B1_1 and the data impulse B1_2 and the period between the data impulse B2_1 and the data impulse B2_2 are 3 mS. The supplying-end module 1 also can adjust the clock of the supplying-end microprocessor 11 in the supplying-end module 1 via comparing the periods between the data impulses DB1_1-DB1_6 and the predetermined values of the system, for adjusting the counting speed of the timer in the supplying-end module 1. However, since the periods between the data impulses DB1_1-DB1_6 are short, the level of the periods between the data impulses DB1_1-DB1_6 affected by the counting speed of the timer is slight. Thus, if adjusting the clock of the supplying-end microprocessor 11 via comparing the periods between the data impulses DB1_1-DB1_6 and the predetermined values of the system, the supplying-end module 11 may erroneously determine the difference between the counting speed of the timer in the supplying-end module 1 and that of the timer in the receiving-end module 2 due to errors of the circuitry. In comparison, since the periods between the corresponding data impulses in the data frames DF1, DF2 (i.e. the data frame time period TDD1-TDD6 shown in FIG. 35) is greater, the level of the periods between the corresponding data impulses in the data frames DF1, DF2 affected by the counting speed of the timer is greater. Thus, adopting the periods between the corresponding data impulses in the data frames DF1, DF2 to determine the difference between the counting speed of the supplying-end module 1 and that of the receiving-end module 2 equips with higher accuracy.

Figure 36:
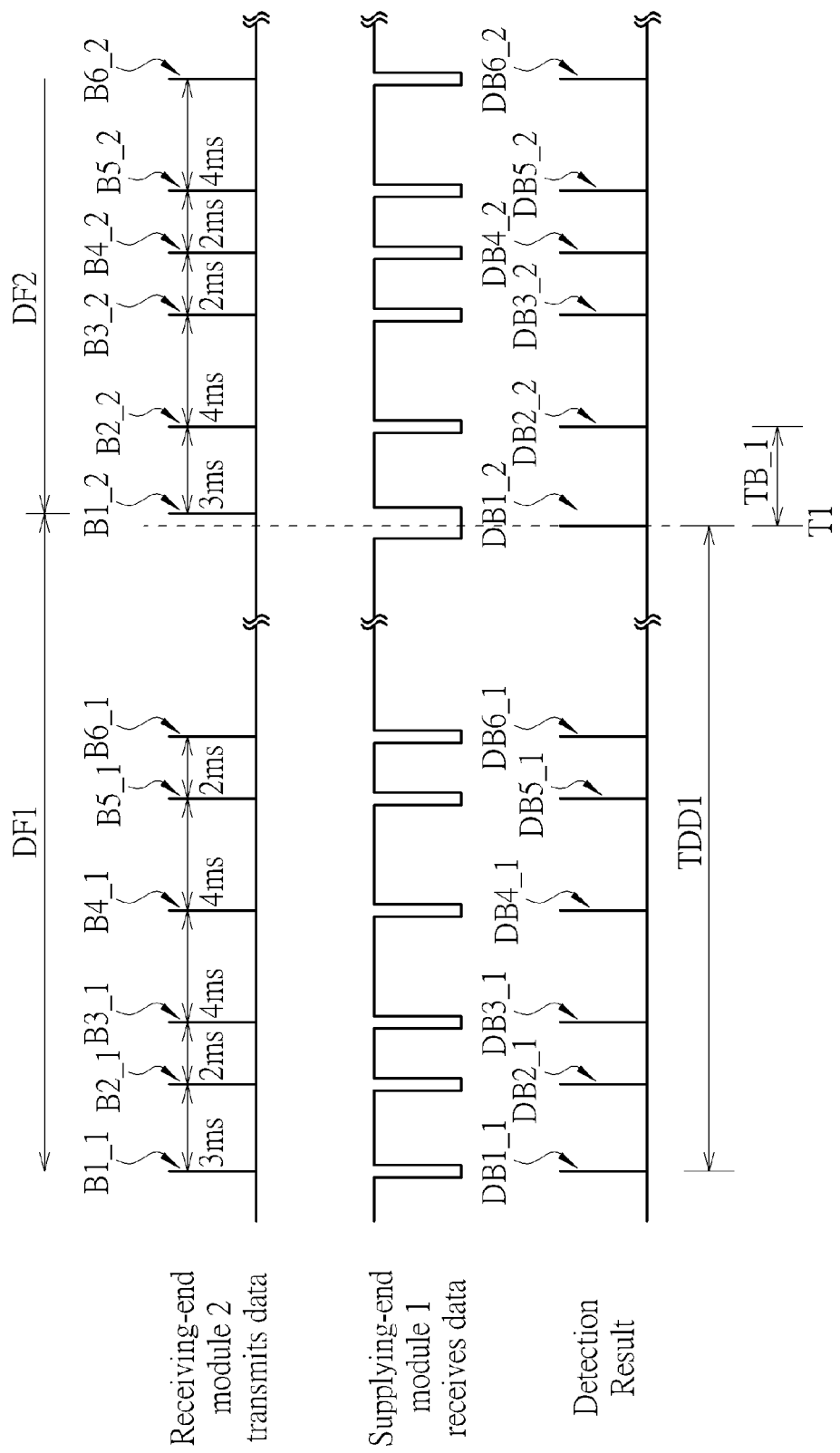
FIG. 36 is a schematic diagram of related signals when the induction type power supply system of the present invention operates.

On the other hand, if noise happens in detecting intervals of the supplying-end module 1, the supplying-end module 1 may acquire erroneous data frame time period TDD_1-TDD_6 and the accuracy of the data transmission between the supplying-end module 1 and the receiving-end module 2 may be affected. The induction type power supply system disclosed in the present invention further eliminates the effect of the noise via comparing the periods between corresponding data impulses in the data frame and the bit lengths predetermined in the system. Please refer to FIG. 36, which is a schematic diagram of related signals when the induction type power supply system of the present invention operates. As shown in FIG. 36, the counting speed of the supplying-end module 1 and that of the receiving-end module 2 are synchronized. However, the supplying-end module 1 erroneously determines the data impulse B2_1 generates at a time T1 due to the noise, and generates the data impulses DB2_1 accordingly. If the supplying-end module 1 adjusts the clock of the supplying-end module 1 according to the data frame period TDD_1 shown in FIG. 36, the clock of the supplying-end microprocessor 11 will be slowed, resulting in the data transmission between the supplying-end module 1 and the receiving-end module 2 works abnormally. Therefore, before adjusting the counting speed, the supplying-end module 1 determines whether the data frame period TDD_1 is affected by the noise via comparing the bit period TB_1 between the data impulse DB2_1 and the data impulse DB2_2 of the data frame DF2 and a bit time threshold predetermined in the system. For example, the bit time threshold can be the bit lengths corresponding to the start bit predetermined in the system. When a difference between the bit period TB_1 between the data impulse DB2_1 and the data impulse DB2_2 and the bit time threshold (e.g. 3 mS) exceeds an error range, the supplying-end module 1 determines the data frame period TDD_1 is affected by the noise and does not adjust the clock of the supplying-end microprocessor 11; otherwise, if the difference between the bit period TB_1 between the data impulse DB2_1 and the data impulse DB2_2 and the bit time threshold is within the error range, the supplying-end module 1 adjusts the clock of the supplying-end microprocessor 11 according to the data frame period TDD_1. That is, the supplying-end module 1 avoids adjusting the clock of the supplying-end microprocessor 11 erroneously by comparing the bit period TB_1 between the data impulse DB2_1 and the data impulse DB2_2 and the bit time threshold predetermined in the system.

Figure 37:
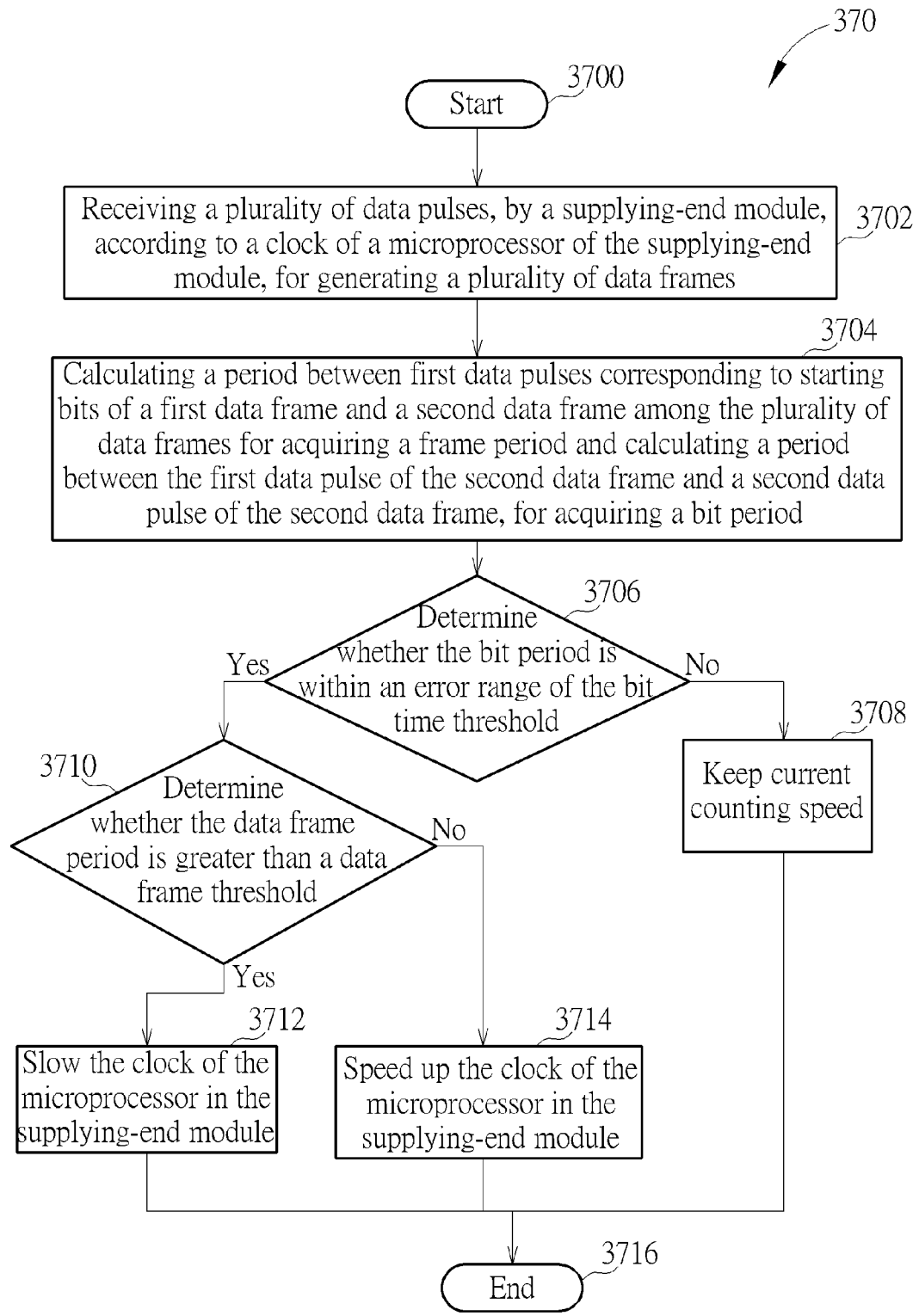
FIG. 37 is a flow chart of an operating clock synchronization adjusting method according to an embodiment of the present invention.

The procedure of the above induction type power supply system adjusting the period between the contiguous data frames and the period between the data impulses in the data frame can be summarized into an operating clock synchronization method 370, as shown in FIG. 37. The operating clock synchronization method 370 comprises the following steps:

Step 3700: Start.

Step 3702: Receiving a plurality of data pulses, by a supplying-end module, according to a clock of a microprocessor of the supplying-end module, for generating a plurality of data frames.

Step 3704: Calculating a period between first data pulses corresponding to starting bits of a first data frame and a second data frame among the plurality of data frames for acquiring a frame period and calculating a period between the first data pulse of the second data frame and a second data pulse of the second data frame, for acquiring a bit period.

Step 3706: Determine whether the bit period is within an error range of the bit time threshold. If the bit period is not within an error range of the bit time threshold, perform step 3708; otherwise, perform step 3710.

Step 3708: Keep current counting speed.

Step 3710: Determine whether the data frame period is greater than a data frame threshold. If the data frame period is greater than a data frame threshold, perform step 3712; otherwise, perform step 3714.

Step 3712: Slow the clock of the microprocessor in the supplying-end module. Go to Step 3716.

Step 3714: Speed up the clock of the microprocessor in the supplying-end module.

Step 3716: End.

According to the operating clock synchronization method 370, the supplying-end module in the induction type power supply system can avoid erroneously adjusting the clock of the microprocessor in the supplying-end module due to noise, such that the counting speed of the timer of the supplying-end module and that of the timer of the receiving end module is synchronized accurately. The detailed operation procedures of the operating clock synchronization adjusting method 370 can be known by referring to the above and are not described herein for brevity.

Figure 38:
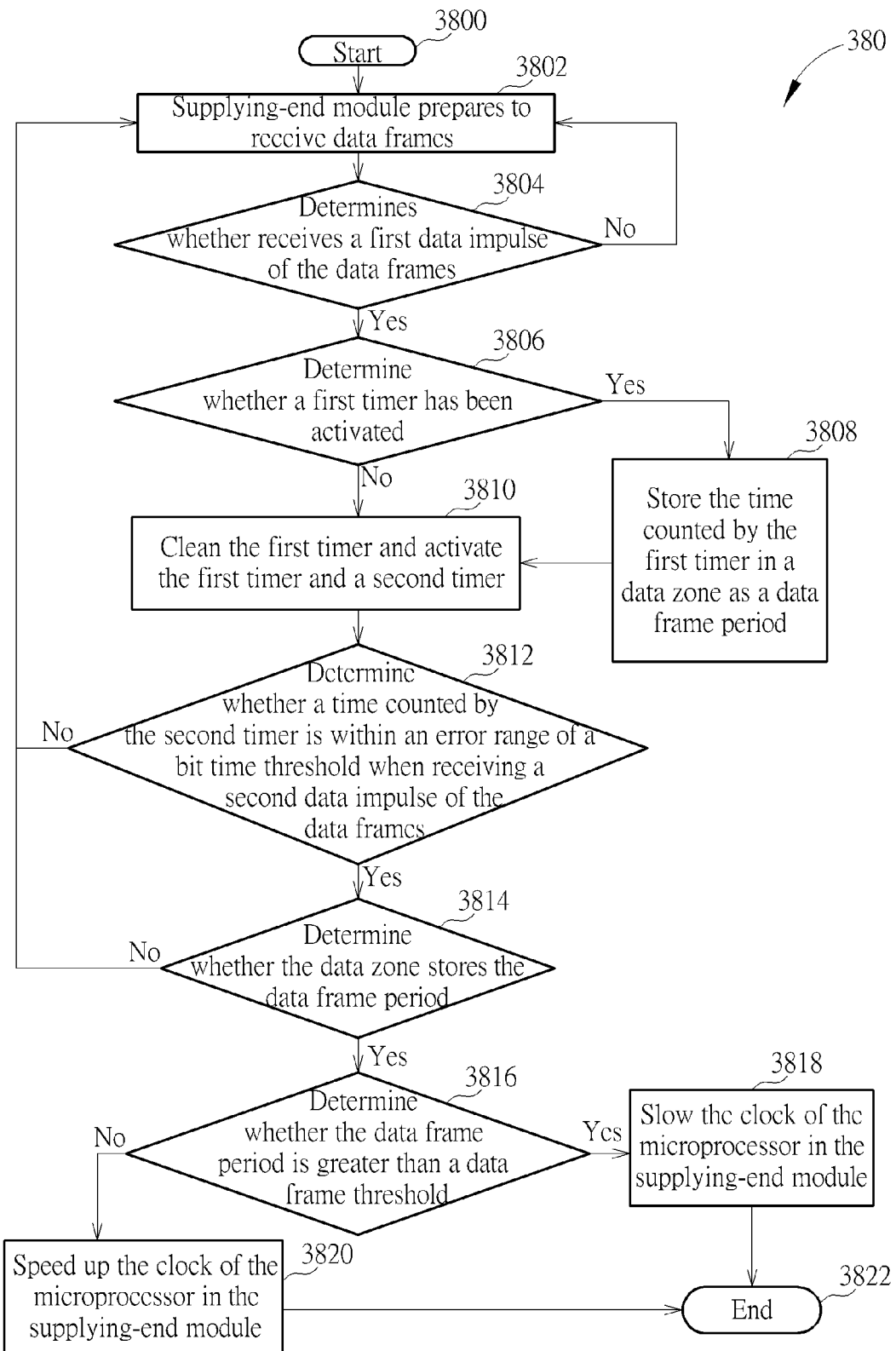
FIG. 38 is a flow chart of a realization method of the operating clock synchronization adjusting method shown in FIG. 37.

Please refer to FIG. 38, which is a schematic diagram of an operating clock synchronization adjusting method 380 according to an embodiment of the present invention. The operating clock synchronization adjusting method 380 is a realization method of the operating clock synchronization adjusting method 370 shown in FIG. 37. As shown in FIG. 38, the operating clock synchronization adjusting method 380 comprises the following steps:

Step 3800: Start.

Step 3802: Supplying-end module prepares to receive data frames.

Step 3804: Determines whether receives a first data impulse of the data frames (e.g. the data impulse corresponding to the start bit). When receiving the first data impulse, perform step 3806; otherwise, perform step 3802.

Step 3806: Determine whether a first timer has been activated. If the first timer has been activated, perform step 3808; otherwise, perform step 3810.

Step 3808: Store the time counted by the first timer in a data zone as a data frame period.

Step 3810: Clean the first timer and activate the first timer and a second timer.

Step 3812: Determine whether a time counted by the second timer is within an error range of a bit time threshold when receiving a second data impulse of the data frames. If the time counted by the second timer is within the error range of the bit time threshold, perform step 3814; otherwise, perform step 3802.

Step 3814: Determine whether the data zone stores the data frame period. If the data zone stores the data frame period, perform step 3816; otherwise, perform step 3802.

Step 3816: Determine whether the data frame period is greater than a data frame threshold. If the data frame period is greater than a data frame threshold, perform step 3818; otherwise, perform step 3820.

Step 3818: Slow the clock of the microprocessor in the supplying-end module. Go to Step 3822.

Step 3820: Speed up the clock of the microprocessor in the supplying-end module.

Step 3822: End.

According to the operating clock synchronization adjusting method 308, the supplying-end module in the induction type power supply system can avoid erroneously adjusting the clock of the microprocessor in the supplying-end module due to noise, such that the counting speed of the timer of the supplying-end module and that of the timer of the receiving end module is synchronized accurately. The detailed operation procedures of the operating clock synchronization adjusting method 380 can be referred to the above and are not described herein for brevity.

To sum up, via comparing the bit time corresponding to the start bit and the bit time threshold predetermined in the system, the above embodiments determine whether to adjust the clock of the microprocessor in the supplying-end module according to the period between the data impulses corresponding to the start bit in the contiguous data frames and the data frame time threshold predetermined in the system. The counting speed of the timer using the clock of the microprocessor in supplying-end module can be appropriately adjusted, and the problem of the supplying-end module erroneously adjusts the clock of the microprocessor in the supplying-end module due to the noise can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An operating clock synchronization adjusting method, for an induction type power supply system, comprising:
   receiving a plurality of data pulses, by a supplying-end module, according to a lock of a microprocessor of the supplying-end module, for generating a plurality of data frames;
   calculating a period between first data pulses corresponding to starting bits of a first data frame and a second data frame among the plurality of data frames, for acquiring a data frame period;
   calculating a period between the first data pulse of the second data frame and a second data pulse of the second data frame, for acquiring a bit period; and
   comparing the bit period and a bit time threshold, for determining whether to adjust the clock of the microprocessor according to the data frame period and a frame time threshold.

2. The operating clock synchronization adjusting method of claim 1, wherein the first data frame and the second data frame are continuous data frames of the plurality of data frames.

3. The operating clock synchronization adjusting method of claim 1, wherein the step of comparing the bit period and the bit time threshold, for determining whether to adjust the clock of the microprocessor according to the data frame period and the frame time threshold comprises:
   adjusting the clock of the microprocessor according to the data frame period and the frame time threshold when the bit period is within an error range of the bit time threshold.

* * * * *